United States Patent
Okamoto

(10) Patent No.: US 9,826,135 B2
(45) Date of Patent: Nov. 21, 2017

(54) INFORMATION PROCESSING METHOD, CONTROL DEVICE, RECORDING DEVICE, INFORMATION PROCESSING SYSTEM AND PROGRAM

(71) Applicant: Sony Corporation, Tokyo (JP)

(72) Inventor: Keiji Okamoto, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/118,705

(22) PCT Filed: Jan. 14, 2015

(86) PCT No.: PCT/JP2015/050824
§ 371 (c)(1),
(2) Date: Aug. 12, 2016

(87) PCT Pub. No.: WO2015/151546
PCT Pub. Date: Oct. 8, 2015

(65) Prior Publication Data
US 2017/0054891 A1 Feb. 23, 2017

(30) Foreign Application Priority Data

Mar. 31, 2014 (JP) ................................. 2014-073030

(51) Int. Cl.
*H04N 5/77* (2006.01)
*H04N 5/232* (2006.01)
(Continued)

(52) U.S. Cl.
CPC ......... *H04N 5/23203* (2013.01); *G08C 17/02* (2013.01); *H04N 5/247* (2013.01);
(Continued)

(58) Field of Classification Search
CPC ...... H04N 5/23203; H04N 5/247; H04N 5/77; H04N 5/91; G08C 17/02; H04W 75/02
(Continued)

(56) References Cited

U.S. PATENT DOCUMENTS 8,041,025 B2 * 10/2011 Dolph ...................... H04N 5/60
379/388.03
2004/0017483 A1 1/2004 Kitaugi et al.
2005/0271355 A1 12/2005 Gilor

FOREIGN PATENT DOCUMENTS

JP H10-271431 A 10/1998
JP 2001-188562 A 7/2001
(Continued)

OTHER PUBLICATIONS

Extended European Search Report dated Oct. 4, 2017 for corresponding European Application No. 15773704.0.

*Primary Examiner* — Robert Chevalier
(74) *Attorney, Agent, or Firm* — Michael Best & Friedrich LLP

(57) ABSTRACT

[Object] To provide an information processing method, a control device, a recording device, an information processing system and a program which enable automatic control of a response sound of a recording device, with respect to an operation ordered by the control device.
[Solution] Provided is an information processing method and an information processing system including establishing a connection, by a recording device, to a control device via communication, and determining a control mode of a response sound in the recording device with respect to an operation ordered by the control device depending on whether a plurality of recording devices are connected to the control device.

23 Claims, 12 Drawing Sheets

(51) Int. Cl.
   *G08C 17/02*   (2006.01)
   *H04N 5/247*   (2006.01)
   *H04N 5/91*    (2006.01)
   *H04W 76/02*   (2009.01)

(52) U.S. Cl.
   CPC .................. *H04N 5/77* (2013.01); *H04N 5/91* (2013.01); *H04W 76/02* (2013.01)

(58) Field of Classification Search
   USPC ....... 386/223, 224, 248, 291, 299, 324, 323, 386/341
   See application file for complete search history.

(56) References Cited

FOREIGN PATENT DOCUMENTS

| | | |
|---|---|---|
| JP | 2001-326845 A | 11/2001 |
| JP | 2004-222057 A | 8/2004 |
| JP | 2012-119846 A | 6/2012 |
| JP | 2013-150079 A | 8/2013 |

\* cited by examiner

INFORMATION PROCESSING METHOD, CONTROL DEVICE, RECORDING DEVICE, INFORMATION PROCESSING SYSTEM AND PROGRAM

TECHNICAL FIELD

The present disclosure relates to an information processing method, a control device, a recording device, an information processing system and a program.

BACKGROUND ART

In recent years, products in which a communication technology is applied to a device which has an imaging function and a recording function such as a video camera have circulated commonly. As for such a device, an operation may be controlled via communication by an information processing device, etc. in the outside.

For example, in Patent Literature 1, an invention to control an operation of a plurality of imaging devices by using one remote controller has been disclosed.

In addition, in Patent Literature 2, an invention in which a plurality of imaging devices are connected mutually via communication, and other imaging devices having received a notification from one imaging device perform operation based on the relevant notification has been disclosed.

CITATION LIST

Patent Literature

Patent Literature 1: JP 2001-326845A
Patent Literature 2: JP 2012-119846A

SUMMARY OF INVENTION

Technical Problem

However, when a plurality of imaging devices are ordered from a control device, etc. to start recording, a recording start sound emitted in starting recording in imaging devices may be recorded by other imaging devices. Therefore, it is necessary for a user to change settings with respect to each of a plurality of imaging devices so that the recording start sound may not be output, and manipulating of the imaging device takes time and effort.

Then, the present disclosure proposes a new and improved information processing method, control device, recording device, information processing system and program which enable automatic control of a response sound of a recording device, with respect to an operation ordered by the control device.

Solution to Problem

According to the present disclosure, there is provided an information processing method including establishing a connection, by a recording device, to a control device via communication, and determining a control mode of a response sound in the recording device with respect to an operation ordered by the control device depending on whether a plurality of recording devices are connected to the control device.

According to the present disclosure, there is provided a control device including a communication unit configured to establish a connection to a recording device via communication, and a determination unit configured to determine a control mode of a response sound in the recording device with respect to an operation ordered by the control device depending on whether a plurality of recording devices are connected to the control device.

According to the present disclosure, there is provided a recording device including a communication unit that is connected to a control device via communication, and a determination unit configured to determine a control mode of a response sound in the recording device with respect to an operation ordered by the control device depending on whether a plurality of recording devices are connected to the control device.

According to the present disclosure, there is provided an information processing system including a communication unit configured to establish a connection to a control device via communication, and a determination unit configured to determine a control mode of a response sound in a recording device with respect to an operation ordered by the control device depending on whether a plurality of recording devices are connected to the control device.

According to the present disclosure, there is provided a program for making a computer realize a communication function configured to establish a connection to a control device via communication, and a determination function configured to determine a control mode of a response sound in a recording device with respect to an operation ordered by the control device depending on whether a plurality of recording devices are connected to the control device.

Advantageous Effects of Invention

As described above, according to the present disclosure, there are provided with an information processing method, a control device, a recording device, an information processing system and a program which enable automatic control of a response sound of a recording device, with respect to an operation ordered by the control device. Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that descriptions will be assumed to be given in the following order.

1. Summary of information processing system according to an embodiment of the present disclosure
2. First embodiment of the present disclosure (example of determining control mode of response sound in imaging device)
   2-1. Configuration of information processing system
   2-2. Processing of information processing system
   2-3. Modification example
3. Second embodiment of the present disclosure (example of determining control mode of response sound in control device)
   3-1. Configuration of information processing system
   3-2. Processing of information processing system
   3-3. Modification example
4. Hardware configuration of control device according to an embodiment of the present disclosure
5. Conclusion

1. SUMMARY OF INFORMATION PROCESSING SYSTEM ACCORDING TO AN EMBODIMENT OF THE PRESENT DISCLOSURE

Figure 1:
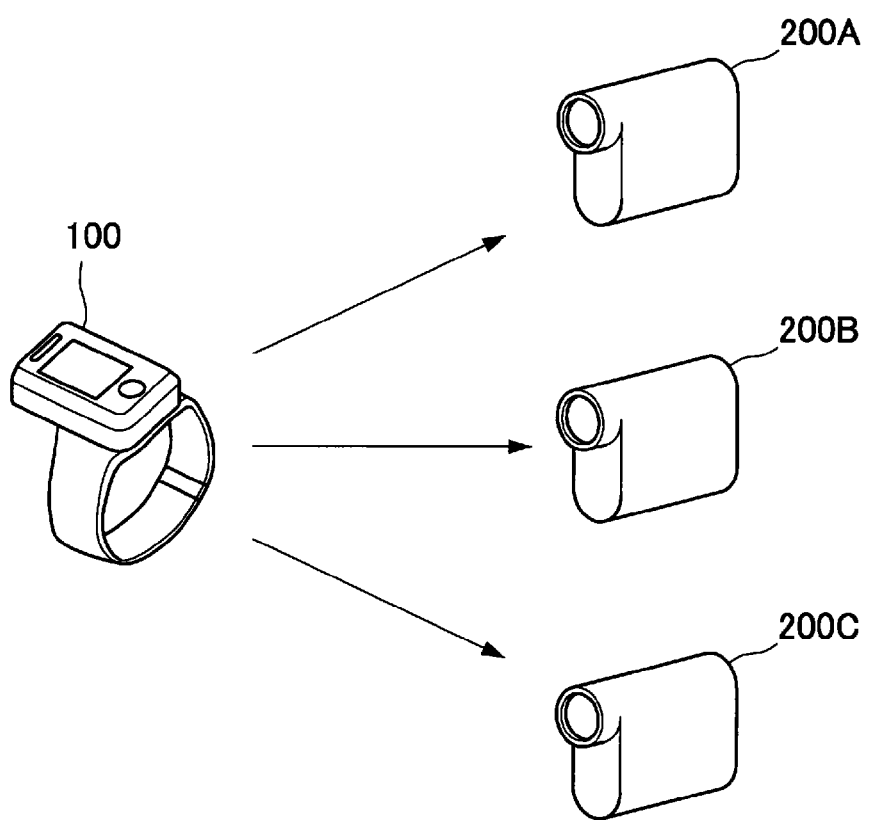
FIG. 1 is a diagram for explaining an outline of an information processing system according to an embodiment of the present disclosure.

First, a summary of an information processing system according to an embodiment of the present disclosure will be described with reference to FIG. 1. FIG. 1 is a diagram for explaining an outline of the information processing system according to an embodiment of the present disclosure.

The information processing system according to an embodiment of the present disclosure is configured by a control device 100 and an imaging device 200. The control device 100 is a portable mobile communication terminal moved by a user, and performs communication connection with a plurality of imaging devices 200. Furthermore, the control device 100 has a function to perform operation control of the plurality of imaging devices 200 in parallel. Accordingly, the control device 100 can control operations of the plurality of imaging devices 200 in parallel via communication. In addition, the imaging device 200 has a communication function, an imaging function and a recording function. Furthermore, the imaging device 200 has a function to control a response sound with respect to an operation ordered by the control device 100. Accordingly, when receiving an operation order of imaging and recording (hereafter, referred to also as imaging etc.) from the control device 100, the imaging device 200 can output a response sound with respect to the relevant operation and perform imaging etc.

For example, as illustrated in FIG. 1, the control device 100 and imaging devices 200A to 200C can perform communication connection and it is possible for the control device 100 to give an operation order of imaging etc. to each of the imaging devices 200A to 200C via communication. In addition, when receiving the operation order of imaging etc. from the control device 100, it is possible for each of the imaging devices 200A to 200C to output the response sound with respect to the ordered imaging etc. and perform imaging etc.

Here, when a plurality of imaging devices 200 are connected to the control device 100, a response sound of other imaging devices 200 may be recorded when each of the plurality of imaging devices 200 outputs the response sound to the ordered operation with respect to the operation order from the control device 100. Therefore, it is necessary for a user to carry out setting change so that the response sound may not be output with respect to each of the plurality of imaging devices 200, and manipulating the imaging device 200 may take time and effort. Then, the information processing system according to an embodiment of the present disclosure determines a control mode of a response sound in the imaging device 200 with respect to an operation ordered by the control device 200 depending on whether a plurality of imaging devices 200 are connected to the control device 100.

For example, when establishing communication connection with the control device 100, each of the imaging devices 200A to 200C carries out confirming whether a plurality of imaging devices 200 are connected to the control device 100. When a plurality of imaging devices 200 are connected, each of the imaging devices 200A to 200C performs determination not to output a response sound with respect to an operation ordered by the control device 100, and carries out setting so that a response sound may not be output. Then, as illustrated in FIG. 1, when receiving an operation order of imaging etc. from the control device 100, the imaging devices 200A to 200C perform imaging etc. without outputting a response sound with respect to imaging etc. in accordance with settings of the response sound.

In this way, the information processing system according to an embodiment of the present disclosure determines a control mode of a response sound in the imaging device 200 with respect to an operation ordered by the control device 200 depending on whether a plurality of imaging devices 200 are connected to the control device 100. Accordingly, it becomes possible to enhance a user's convenience as the response sound of the imaging device 200 is controlled automatically. Note that, although a remote controller with a display is illustrated as an example of the control device 100 in FIG. 1, the control device 100 may be a mobile communication terminal such as a smart phone, a tablet terminal, a digital camera, a handheld game machine or a personal digital assistant (PDA). For convenience of explanation, each of the control device 100 and imaging device 200 according to a first and a second embodiment is discriminated by giving a number corresponding to the embodiment at the tail like a control device 100-1 and a control device 100-2.

2. FIRST EMBODIMENT OF THE PRESENT DISCLOSURE (EXAMPLE OF DETERMINING CONTROL MODE OF RESPONSE SOUND IN IMAGING DEVICE)

In the above, a summary of the information processing system according to an embodiment of the present disclosure has been described. Next, an information processing system according to the first embodiment of the present disclosure will be described. In the information processing system according to the present embodiment, an imaging device 200-1 determines a control mode of a response sound with respect to an operation ordered by a control device 100-1.

[2-1. Configuration of Information Processing System]

Figure 2:
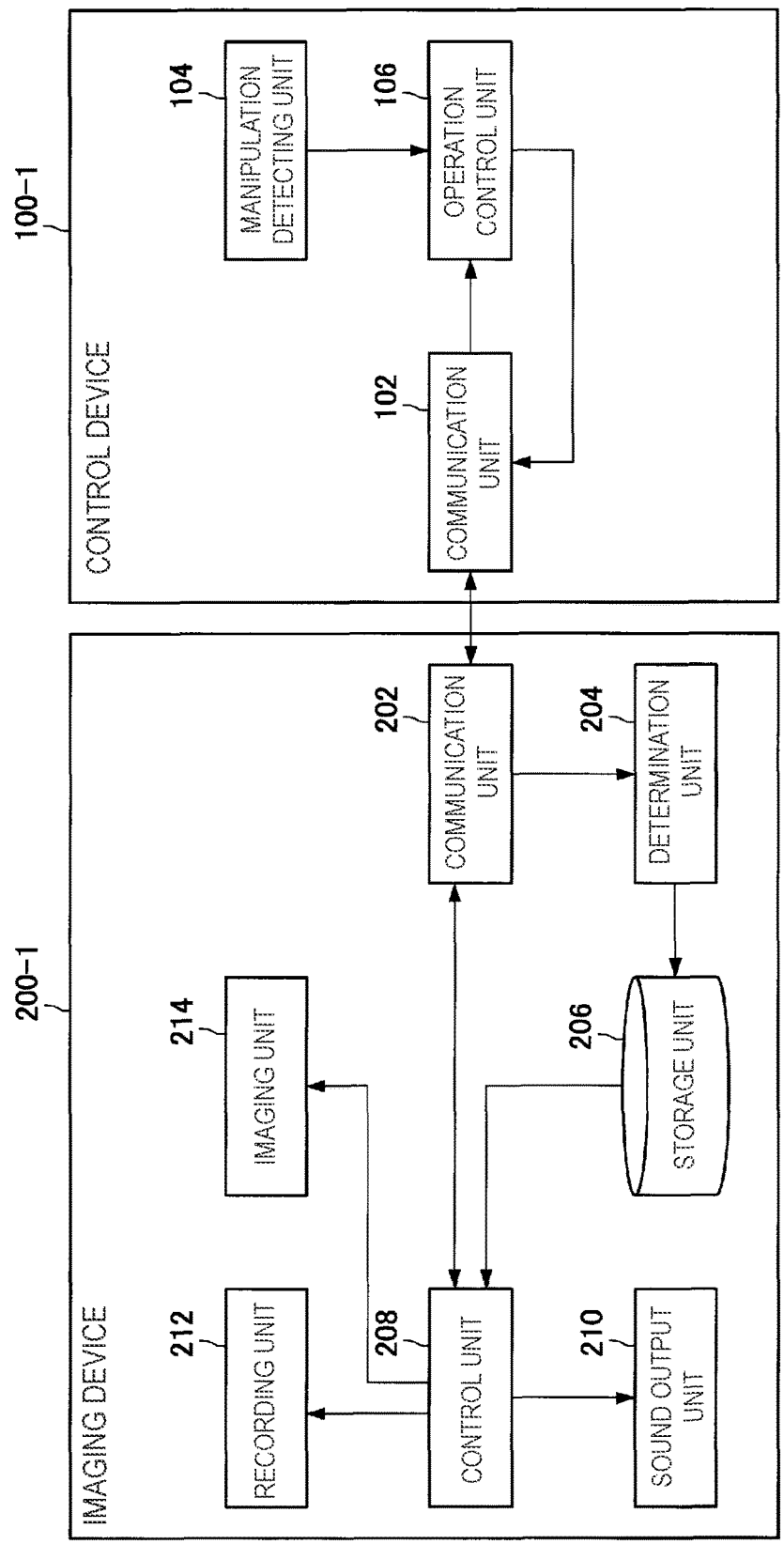
FIG. 2 is a block diagram illustrating a schematic function configuration of an information processing system according to a first embodiment of the present disclosure.

First, a configuration of the information processing system according to the first embodiment of the present disclosure will be described with reference to FIG. 2. FIG. 2 is a block diagram illustrating a schematic function configuration of the information processing system according to the first embodiment of the present disclosure.

The information processing system according to the present embodiment is configured by the control device 100-1 and the imaging device 200-1 as illustrated in FIG. 2.

The imaging device 200-1 includes a communication unit 202, a determination unit 204, a storage unit 206, a control unit 208, a sound output unit 210, a recording unit 212 and an imaging unit 214 as a recording device.

The communication unit 202 performs communication with the control device 100-1. Specifically, the communication unit 202 receives operation order information from the control device 100-1, and transmits operation result notification information to the control device 100-1. In addition, when establishing communication connection with the control device 100-1, the communication unit 202 receives information of a communication mode from the control device 100-1, and determines a communication mode based on the received information of the communication mode, and performs communication processing in accordance with the determination result.

For example, the communication unit 202 determines whether the communication mode indicated by the information of the communication mode received from the control device 100-1 is either a single connection or a multiple connection, and performs communication processing in accordance with the determination result. Note that, the single connection may be a communication mode where the imaging device 200-1 is connected alone with the control device 100-1, and the multiple connection may be a communication mode where a plurality of imaging devices 200-1 are connected with the control device 100-1. In addition, the communication unit 102 may perform a wireless communication using WiFi (registered trademark), Bluetooth (registered trademark), Zigbee (registered trademark), or the like.

Note that, although an example has been described in the above where the communication unit 202 determines whether a plurality of imaging devices 200-1 are connected based on the information of communication mode received from the control device 100-1, the communication unit 202 may determine autonomously whether a plurality of imaging devices 200-1 are connected. Specifically, when communication with the control device 100-1 is performed, the communication unit 202 discriminates a communication protocol used for the relevant communication, and determines whether a plurality of imaging devices 200-1 are connected to the control device 100-1 depending on whether the discriminated communication protocol is a predetermined communication protocol.

For example, the communication unit 102 of the control device 100-1 may perform communication with a plurality of imaging devices 200-1 using a user datagram protocol (UDP). Then, the communication unit 202 discriminates a communication protocol according to communication with the control device 100-1, and determines that a plurality of imaging devices 200-1 are connected to the control device 100-1 when the discriminated communication protocol is UDP. In this case, as communication with respect to information of a communication mode to or from the control device 100-1 becomes unnecessary, reduction of a communication traffic and shortening of a processing time at the time of communication establishment become possible.

The determination unit 204 determines a control mode of a response sound with respect to an operation ordered by the control device 100-1. Specifically, depending on whether a plurality of imaging devices 200-1 are connected to the control device 100-1, the determination unit 204 determines the control mode of the response sound in the imaging device 200-1 with respect to the operation ordered by the control device 100-1. Then, the determination unit 204 makes the determined control mode of the response sound stored in the storage unit 206 as setting information of the output control of the response sound (hereafter, also referred to as setting information of the response sound). More specifically, depending on whether the communication mode determined by the communication unit 202 is single connection or multiple connection, the determination unit 204 determines an output presence/absence and an output mode of the response sound with respect to the operation ordered by the control device 100-1. For example, when the communication mode is determined to be the multiple connection by the communication unit 202, the determination unit 204 performs determination not to output the response sound.

Note that, although an example in which the determination unit 204 determines the control mode of the response sound at the time of communication connection establishment has been described in the above, the determination unit 204 may determine the control mode of the response sound after the operation order information has been received by the communication unit 202 from the control device 100-1.

The storage unit 206 stores the setting information of the response sound. For example, the storage unit 206 may store the output presence/absence and output mode of the response sound which are determined by the determination unit 204 as setting information such as a flag. Note that, the setting information may be initialized or deleted at the time of cutting communication connection with the control device 100-1 or at the time of activating the imaging device 200-1, etc.

Figure 3:
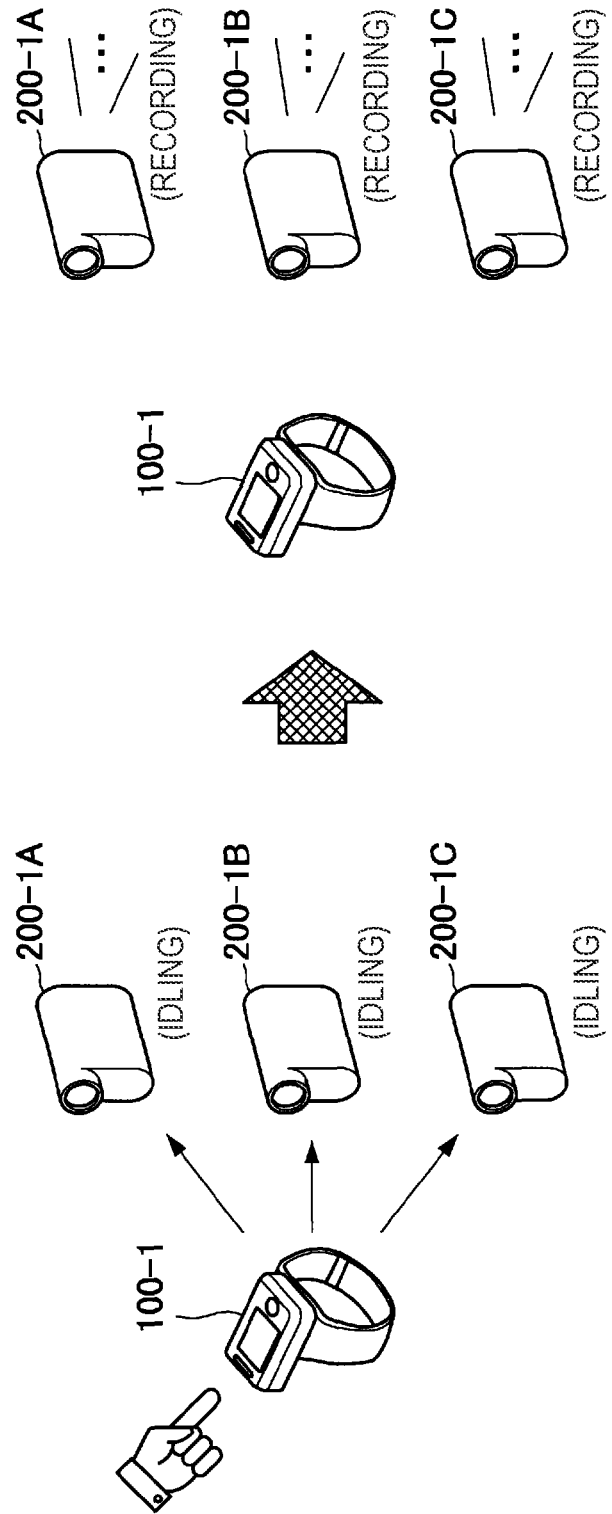
FIG. 3 is an explanatory view illustrating an example of an operation of the information processing system according to the present embodiment.

The control unit 208 controls operations of the sound output unit 210, the recording unit 212 and the imaging unit 214. Specifically, based on the operation order information transmitted from the control device 100-1 and the setting information of the response sound stored in the storage unit 206, the control unit 208 gives to the sound output unit 210 an order of output control of the response sound with respect to the ordered operation, and gives an order of recording control and imaging control to the recording unit 212 and the imaging unit 214. Furthermore, details of processing of the control unit 208 will be described with reference to FIG. 3. FIG. 3 is an explanatory view illustrating an example of an operation of the information processing system according to the present embodiment.

First, the determination unit 204 determines the control mode of the response sound, and makes the determination result stored in the storage unit 206 based on the determination result of the communication mode by the communication unit 202. For example, when the communication mode is determined to be the multiple connection by the communication unit 202 in each of imaging devices 200-1A to 200-1C as illustrated in the left figure of FIG. 3, the determination unit 204 determines not to output the response sound, and makes the storage unit 206 store setting information not to output the response sound. Note that an initial state of each of the imaging devices 200-1A to 200-1C may be "idling".

Next, when the operation order information from the control device 100-1 is received by the communication unit 202, the control unit 208 performs an output control, a recording control and an imaging control of the response sound with respect to the ordered operation based on the relevant operation order information and the setting information of the response sound stored in the storage unit 206. For example, when recording start order information from the control device 100-1 is received by the communication unit 202 in each of the imaging devices 200-1A to 200-1C as illustrated in the left figure of FIG. 3, the control unit 208 acquires setting information not to output the response sound stored in the storage unit 206. Then, in accordance with the acquired setting information of the response sound, as illustrated in the right figure of FIG. 3, the control unit 208 does not order the sound output unit 210 to output a recording start sound with respect to recording start, and orders the recording unit 212 and the imaging unit 214 to start recording to make a state of the imaging device 200-1 transition to "recording" from "idling".

Note that, although an example in which the control mode of the response sound is no outputting has been described in the above, the control mode of the response sound may be outputting outside audible range. Specifically, the control unit 208 may make the sound output unit 210 output the response sound where frequencies in the audible range have been attenuated. For example, while using a frequency filter such as a high pass filter (HPF), the control unit 208 may filter frequencies in the audible range of the response sound, and may make the filtered response sound output to the sound output unit 210. In addition, as another measure, the control unit 208 may make the response sound where frequencies have been modulated into frequencies outside the audible range output to the sound output unit 210. In addition, as still another measure, the control unit 208 may make the response sound where a sound pressure has been reduced output to the sound output unit 210. For example, the control unit 208 may make the sound pressure of the response sound lower than a predetermined sound pressure, and may make the response sound where the sound pressure has been reduced output to the sound output unit 210. Note that, a reduction amount of a sound pressure or a sound pressure value after the reduction may be a fixed value, or may be a setting value changed by a user's manipulation.

In this way, the control mode of the response sound may be muting. Accordingly, it becomes possible to prevent the response sound which is able to be perceived by a human being from being recorded without controlling presence/absence of sound output.

Here, descriptions will return to a configuration of the information processing system with reference to FIG. 2, and then, the sound output unit 210 performs sound output based on an order of the control unit 208. For example, when outputting of the response sound is ordered by the control unit 208, the sound output unit 210 acquires an output signal of the response sound which is stored in the storage unit 206, and performs sound output based on the acquired output signal. Note that the sound output unit 210 may perform sound output based on an output signal processed by the control unit 208.

The recording unit 212 performs recording based on an order of the control unit 208. Specifically, the recording unit 212 performs recording a sound around the imaging device 200-1 based on an order of the control unit 208. For example, when receiving a recording start order from the control unit 208, the recording unit 212 starts sound-collecting of a sound around the imaging device 200-1. Then, the recording unit 212 converts the sound-collected sound into sound data, and provides the control unit 208 with the sound data acquired by the conversion. Furthermore, while making synchronized a time-axis of each of image data acquired by imaging of the imaging unit 214 described later and the relevant sound data, the control unit 208 makes the image data and the sound data stored in the sound storage unit 206 as video data. Note that the recording unit 212 may be a sound collector such as a microphone or a microphone array.

The imaging unit 214 performs imaging based on an order of the control unit 208. Specifically, the imaging unit 214 performs imaging of a subject around the imaging device 200-1 based on an order of the control unit 208. For example, when receiving a recording start order from the control unit 208, the imaging unit 214 performs imaging at a predetermined time interval. Then, the imaging unit 214 provides the control unit 208 with the image data acquired by imaging. Note that, the imaging unit 214 may include an imaging optical system such as a photographing lens and a zoom lens which condense light, and a signal conversion device such as a charge coupled device (CCD) or a complementary metal oxide semiconductor (CMOS).

In addition, the control device 100-1 includes the communication unit 102, a manipulation detecting unit 104, and operation control unit 106 as illustrated in FIG. 2.

The communication unit 102 performs communication with the imaging device 200-1. Specifically, the communication unit 102 transmits the operation order information to the imaging device 200-1, and receives operation completion information from the imaging device 200-1. In addition, when establishing communication connection with the imaging device 200-1, the communication unit 102 transmits information of the communication mode to the imaging device 200-1. Note that, when the communication mode changes thereafter, the communication unit 102 may transmit the communication mode after change to the imaging device 200-1 currently connected.

The manipulation detecting unit 104 detects a user's manipulation with respect to the control device 100-1. Specifically, the manipulation detecting unit 104 detects an operation order manipulation by a user via a manipulation unit which the control device 100-1 includes separately, and provides the operation control unit 106 with the detection result. For example, the manipulation detecting unit 104 may detect a recording start order manipulation with respect to the imaging device 200-1.

The operation control unit 106 generates operation order information with respect to the imaging device 200-1. Specifically, when the user's manipulation is detected by the manipulation detecting unit 104, the operation control unit 106 generates the operation order information with respect to the imaging device 200-1, which corresponds to the relevant user's manipulation, and makes the communication unit 102 transmit the generated operation order information. For example, when the recording start order manipulation of the imaging device 200-1 is detected by the manipulation detecting unit 104, the operation control unit 106 generates the recording start order information with respect to the imaging device 200-1, and makes the communication unit 102 transmit the recording start order information towards each of the connected imaging devices 200-1.

[2-2. Processing of Information Processing System]

Figure 4:
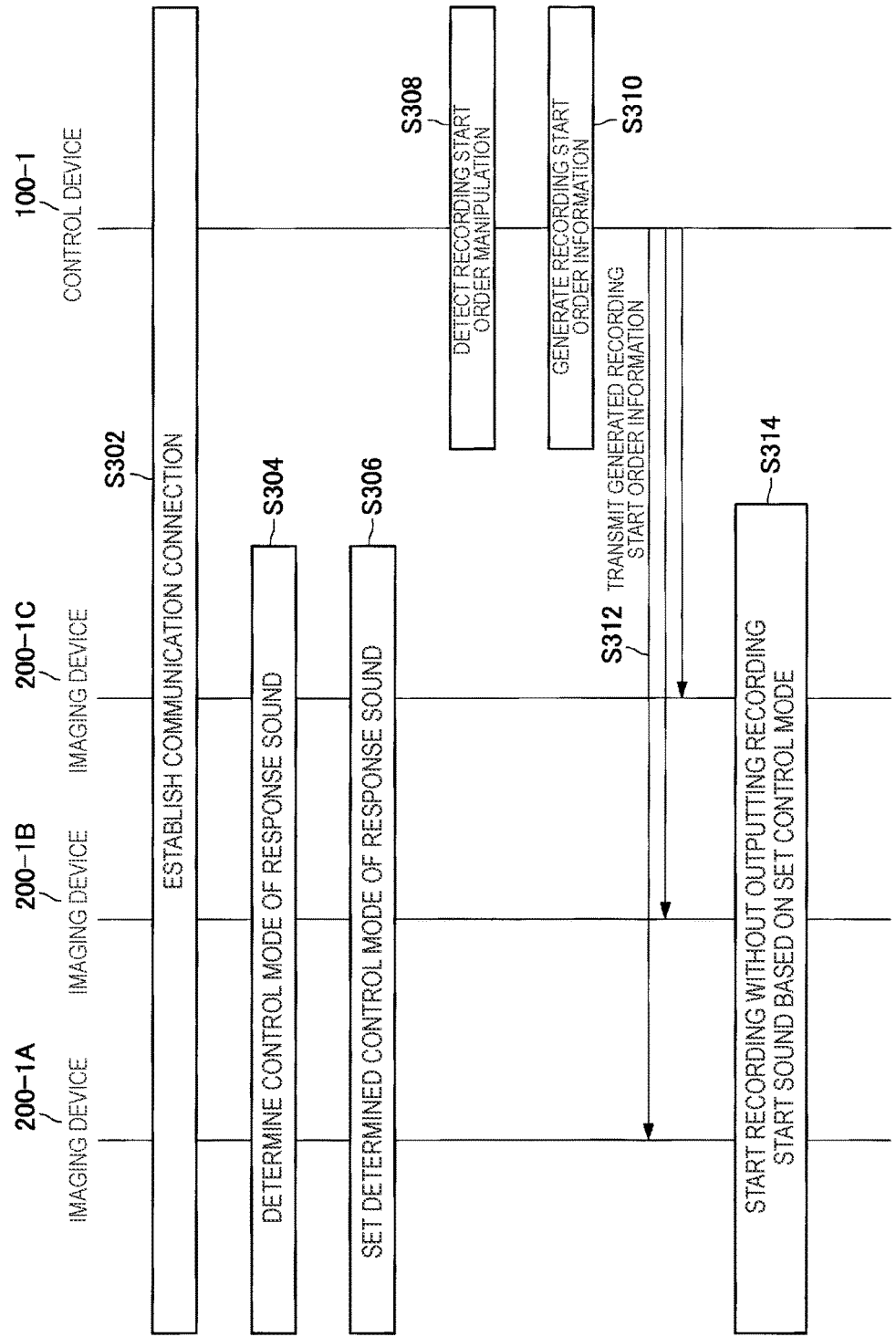
FIG. 4 is a sequence diagram illustrating conceptually processing of the information processing system in the present embodiment.

Next, processing of the information processing system in the present embodiment will be described with reference to FIG. 4. FIG. 4 is a sequence diagram illustrating conceptually processing of an information processing system in the present embodiment. Note that, in FIG. 4, an example of processing of the information processing system which is configured by the control device 100-1 and three imaging devices 200-1A to 200-1C will be described.

First, each of the imaging devices 200-1A to 200-1C and the control device 100-1 establish communication connection (Step S302). Specifically, the communication unit 202 of each of the imaging devices 200-1A to 200-1C transmits a connection request to the communication unit 102 of the control device 100-1, and the communication unit 102 sends back a response with respect to the received connection request, and the connection is established. Note that the communication unit 102 transmits information of the communication mode at the time of the relevant response.

Next, each of the imaging devices 200-1A to 200-1C determines the control mode of the response sound (Step S304). Specifically, the determination unit 204 of each of the imaging devices 200-1A to 200-1C determines the control mode of the response sound with respect to the operation ordered by the control device 100-1 based on the received information of communication mode.

Next, each of the imaging devices 200-1A to 200-1C sets the determined control mode (Step S306). Specifically, the determination unit 204 of each of the imaging devices 200-1A to 200-1C makes the determined control mode stored in the storage unit 206 as setting information.

Thereafter, the control device 100-1 detects a recording start manipulation (Step S308). Specifically, the manipulation detecting unit 104 detects the recording start order manipulation from a user's manipulation via the manipulation unit which the control device 100-1 includes separately.

Next, the control device 100-1 generates the recording start order (Step S310). Specifically, the operation control unit 106 generates the recording start order information based on the recording start manipulation detected by the manipulation detecting unit 104.

Next, the control device 100-1 transmits the generated recording start order to the imaging devices 200-1A to 200-1C (Step S312). Specifically, the communication unit 102 transmits the recording start order information generated by the operation control unit 106 to the imaging devices 200-1A to 200-1C.

Next, each of the imaging devices 200-1A to 200-1C starts recording without outputting the recording start sound based on the set control mode (Step S314). Specifically, when the recording start order information is received by the communication unit 202, the control unit 208 of each of the imaging devices 200-1A to 2001C orders the recording unit 212 and the imaging unit 214 to start recording without ordering the sound output unit 210 to output the recording start sound based on the setting information of the response sound stored in the storage unit 206. Then, the recording unit 212 and the imaging unit 214 start recording and imaging based on the relevant recording start order.

In this way, according to the first embodiment of the present disclosure, the information processing system determines the control mode of the response sound in the imaging device 200-1 with respect to the operation ordered by the control device 100-1 depending on whether a plurality of imaging devices 200-1 are connected to the control device 100-1. Accordingly, the control mode of the response sound is determined automatically, and thus a setting manipulation of the response sound by a user becomes unnecessary, and enhancing a user's convenience becomes possible. In addition, each of the plurality of imaging devices 200-1 determines the control mode of the response sound depending on whether the plurality of imaging devices 200-1 are connected to the control device 100-1, and the imaging device 200-1 controls the response sound in accordance with the determined control mode with respect to the operation ordered by the control device 100-1. Accordingly, as determination of the control mode of the response sound is performed by the imaging device 200-1, it is not necessary to provide determination processing of the control mode of the response sound in the control device 100-1, and practical use of calculation resources to other applications and reduction of a processing load of the control device 100-1 become possible.

[2-3. Modification Example]

In the above, the first embodiment of the present disclosure has been described. Note that the present embodiment is not limited to examples mentioned above. In the following, a first and a second modification example of the present embodiment will be described.

First Modification Example

As a first modification example of the present embodiment, the imaging device 200-1 may determine the control mode of the response sound based on information changing depending on a distance to or from other imaging devices 200-1. Specifically, when a plurality of imaging devices 200-1 are connected to the control device 100-1, the imaging device 200-1 measures a response time of communication with other imaging devices 200-1. Then, the imaging device 200-1 determines the control mode of the response sound based on the measured response time of communication.

Figure 5:
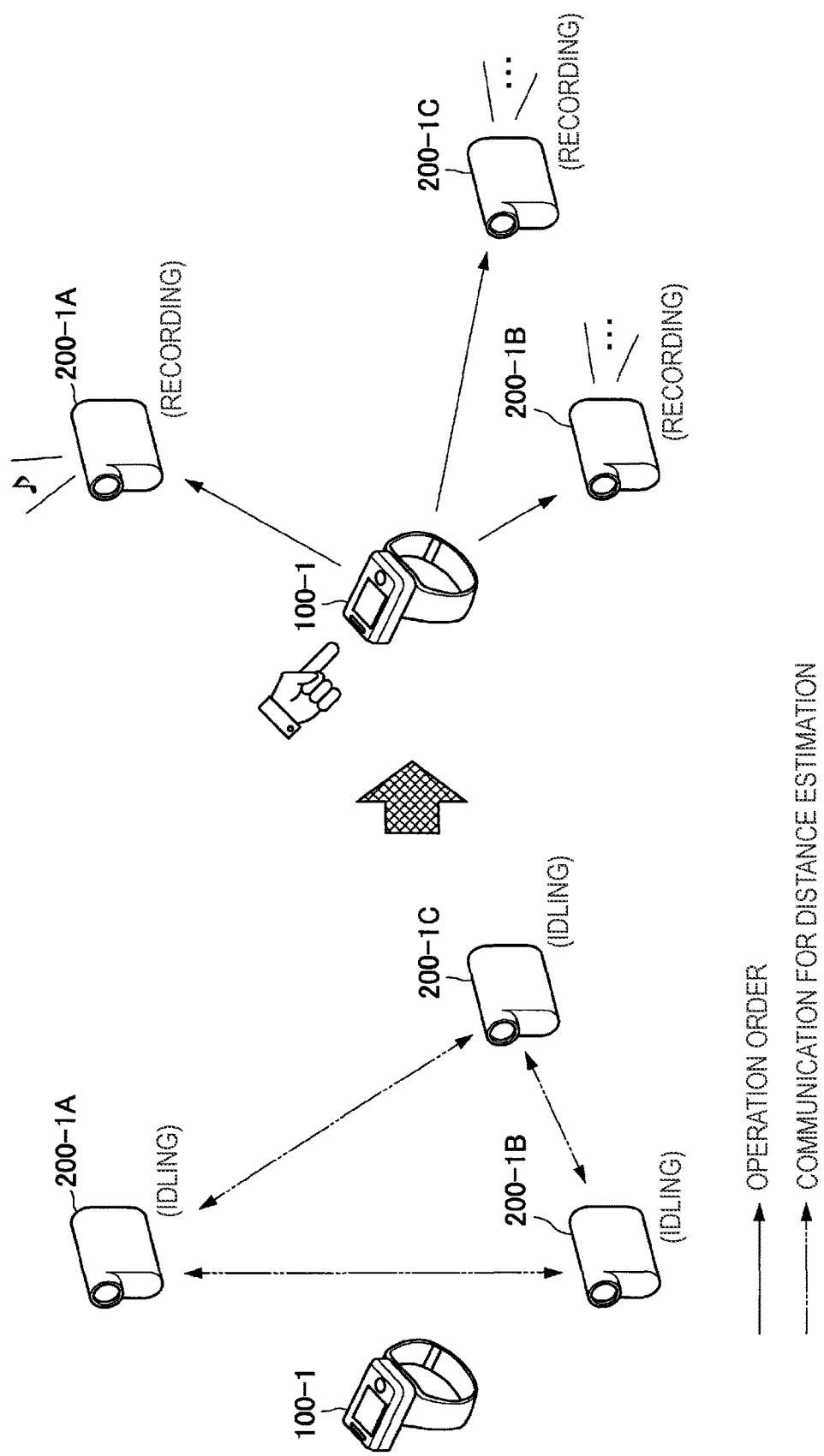
FIG. 5 is an explanatory view illustrating an example of an operation of an information processing system according to a first modification example of the present embodiment.

For example, when the communication mode to or from the control device 100-1 is determined to be the multiple connection from information of the communication mode received from the control device 100-1 when establishing communication connection with the control device 100-1, the communication unit 202 performs communication with other imaging devices 200-1, and may measure the relevant response time of communication. Then, based on the measured response time of communication, the determination unit 204 determines the control mode of the response sound, and may make the determined control mode of the response sound stored as the setting information in the storage unit 206. Furthermore, details of processing of the imaging device 200-1 in the present modification example will be described with reference to FIG. 5. FIG. 5 is an explanatory view illustrating an example of an operation of an information processing system according to the present modification example.

First, when the communication mode to or from the control device 100-1 is determined to be the multiple connection, each of the imaging devices 200-1 performs communication with each of other imaging devices 200-1, and measures each response time of the relevant communication. For example, as illustrated in the left figure of FIG.

5, the communication unit 202 may transmit an IP packet to each of other imaging devices 200-1 by executing ping, etc., and may measure a time until a response with respect to each of the transmitted IP packets is sent back after establishing communication connection with the control device 100-1 in each of the imaging devices 200-1A to 200-1C. Note that, the communication between the imaging devices 200-1 may be performed before establishing communication connection with the control device 100-1.

Next, each of the imaging devices 200-1 determines the control mode of the response sound by comparing the measured response time of communication with a predetermined time, and stores the determined control mode of the response sound as the setting information. For example, in a positional relation of the imaging devices 200-1A to 200-1C as illustrated in the left figure of FIG. 5, the determination unit 204 of the imaging device 200-1B determines the control mode of the response sound to be the muting since a response time from the imaging device 200-1C measured by the communication unit 202 is shorter than a predetermined time. Note that the same processing as the imaging device 200-1B is performed also in the imaging device 200-1C. In addition, since each of the response times from the imaging devices 200-1B and 200-1C measured by the communication unit 202 is longer than a predetermined time, the determination unit 204 of the imaging device 200-1A performs determination to output the response sound. Then, the determination unit 204 makes the determined control mode stored in the storage unit 206 as the setting information. Note that, the predetermined time used for comparing with the response time of communication corresponds to a response time of communication in a distance where a response sound having a predetermined sound pressure has been attenuated to approximately a minimum audible threshold. In addition, the relevant predetermined time may be changed by a user's manipulation with respect to the imaging device 200-1.

Next, when the operation order information is received from the control device 100-1, each of the imaging devices 200-1 controls sound output in accordance with the stored setting information of the response sound. For example, as illustrated in the right figure of FIG. 5, when the recording start order information is received from the control device 100-1, the control unit 208 of the imaging device 200-1A orders the sound output unit 210 to output the recording start sound with respect to the ordered recording start in accordance with the setting information of a response sound stored in the storage unit 206. Next, the sound output unit 210 outputs the recording start sound, and after the recording start sound has been output, the control unit 208 orders the recording unit 212 and the imaging unit 214 to start recording. Then, the recording unit 212 and the imaging unit 214 start recording and imaging. In addition, when the recording start order information is received from the control device 100-1, the control unit 208 of the imaging devices 200-1B and 200-1C orders the recording unit 212 and the imaging unit 214 to start recording without ordering the sound output unit 210 to perform output in accordance with the setting information of the response sound stored in the storage unit 206. Then, the sound output unit 210 does not output the recording start sound, and the recording unit 212 and the imaging unit 214 start recording and imaging.

Figure 6:
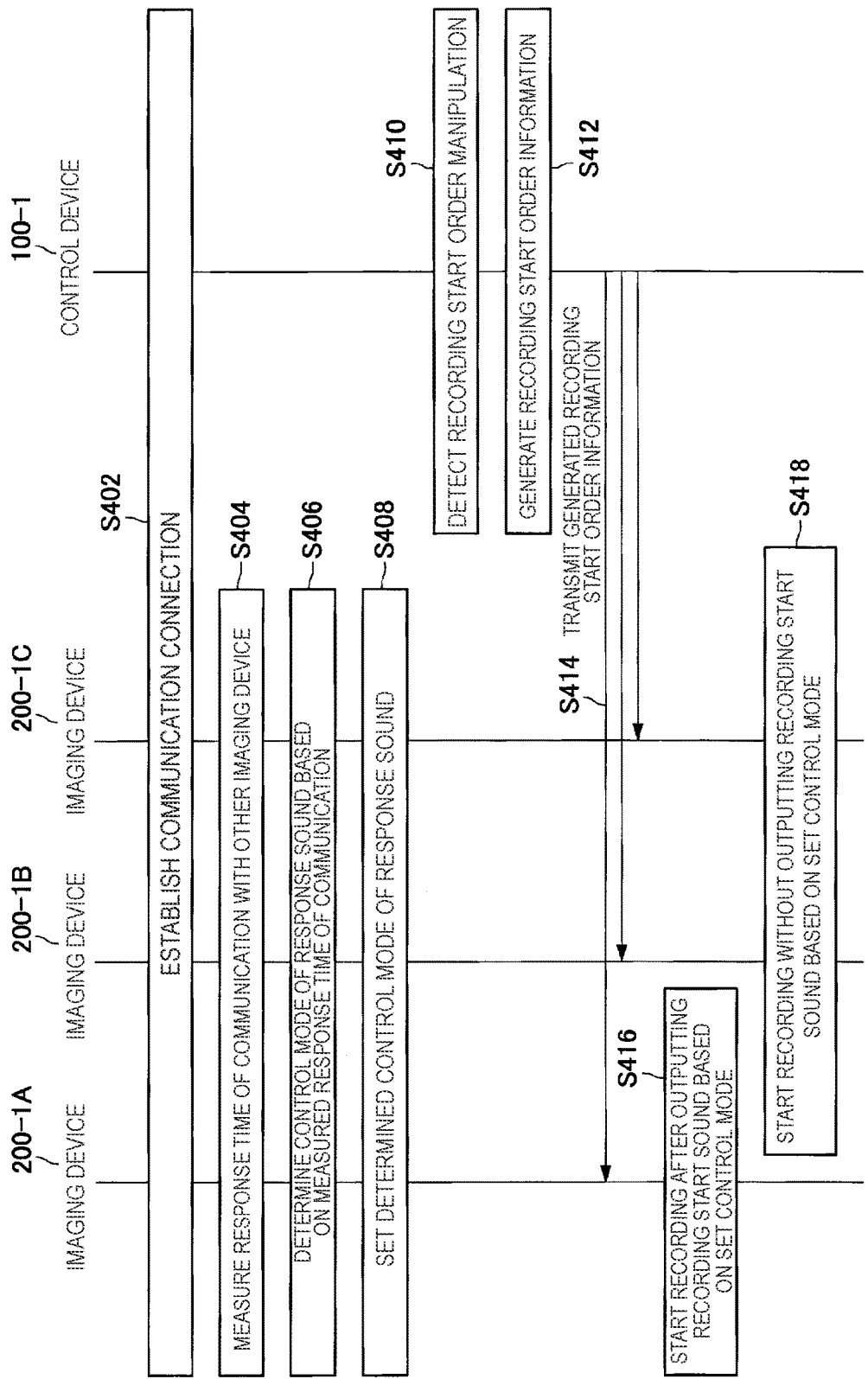
FIG. 6 is a sequence diagram illustrating conceptually processing of the information processing system in the first modification example of the present embodiment.

Subsequently, processing of the information processing system in the present modification example will be described with reference to FIG. 6. FIG. 6 is a sequence diagram illustrating conceptually processing of the information processing system in the present modification example.

First, each of the imaging devices 200-1A to 200-1C and the control device 100-1 establish communication connection (Step S402). Specifically, since the processing is the same substantially as the processing of Step S302 of FIG. 4, the description will be omitted.

Next, each of the imaging devices 200-1A to 200-1C measures a response time of communication with other imaging devices 200-1 (Step S404). Specifically, when the communication mode is determined to be the multiple connection from information of the communication mode received from the control device 100-1, the communication unit 202 performs communication with other imaging devices 200-1, and measures the relevant response time of communication.

Next, each of the imaging devices 200-1A to 200-1C determines the control mode of the response sound based on the measured response time of communication (Step S406). Specifically, when each length of the measured response time of communication is longer than a predetermined time, the determination unit 204 performs determination to output the response sound, and when each length of the response time of communication is shorter than a predetermined time, the determination unit 204 determines the control mode of the response sound to be the muting.

Next, each of the imaging devices 200-1A to 200-1C sets the determined control mode of the response sound (Step S408). Specifically, the determination unit 204 makes the determined output presence/absence of the response sound stored in the storage unit 206 as the setting information.

Thereafter, the control device 100-1 detects the recording start manipulation (Step S410), generates the recording start order information (Step S412), and transmits the generated recording start order information to the imaging devices 200-1A to 200-1C (Step S414). Specifically, since the processing is the same substantially as the processing of Steps S308 to S312 of FIG. 4, the description will be omitted.

Next, the imaging device 200-1A, based on the set control mode, outputs the recording start sound and starts recording (Step S416). Specifically, when the recording start order information is received by the communication unit 202, the control unit 208 of the imaging device 200-1A orders the sound output unit 210 to output the recording start sound based on the setting information of a response sound stored in the storage unit 206. Then, the control unit 208 orders the recording unit 212 and the imaging unit 214 to start recording after the sound output unit 210 has output the recording start sound. Then, the recording unit 212 and the imaging unit 214 start recording and imaging based on the relevant recording start order.

In addition, each of the imaging devices 200-1B and 200-1C starts recording without outputting the recording start sound based on the set control mode (Step S418). Specifically, since the processing is the same substantially as the processing of Step S314 of FIG. 4, the description will be omitted.

In this way, according to the first modification example of the present embodiment, when a plurality of imaging devices 200-1 are connected to the control device 100-1, the imaging device 200-1 acquires information changing depending on a distance to or from other imaging devices 200-1, and determines the control mode of the response sound based on the acquired information. Accordingly, as the response sound is output when the imaging device 200-1 is located apart more than a distance where the response sound is not recorded as compared with other imaging devices 200-1, it becomes possible to make a user easily grasp an operation state of the imaging device 200-1 without the response sound being made to be recorded.

Note that, although an example where the communication unit 202 performs communication for measurement of the response time of communication has been described in the above, the communication unit 202 may measure the response time of communication using an existing communication with other imaging devices 200-1. In this case, the communication for measurement of the response time of communication becomes unnecessary, and reduction of a communication traffic and simplification of communication processing become possible.

In addition, although an example where the sound output unit 210 outputs the recording start sound has been described in the above, the control unit 208 may change a sound pressure of the recording start sound output by the sound output unit 210 based on information changing depending on a distance. Specifically, depending on a magnitude of a difference between the response time of communication measured by the communication unit 202 and a predetermined time, the control unit 208 changes the sound pressure of the recording start sound from a predetermined sound pressure, and controls the sound output unit 210 to perform output of the recording start sound from the sound output unit 210 with the changed sound pressure. For example, when the measured response time of communication is larger than a predetermined time, the control unit 208 may make the sound pressure of the recording start sound larger than a predetermined value. In this case, as the sound pressure of the recording start sound is adjusted in the range where the recording start sound is not recorded depending on an arrangement state of the imaging devices 200-2, it becomes possible to make a user easily notice the recording start sound.

Second Modification Example

As a second modification example of the present embodiment, the imaging device 200-1 may visually indicate the response with respect to the operation which is ordered from the control device 100-1 to the imaging device 200-1 when the control mode of a response sound is the muting. Specifically, the imaging device 200-1 further includes a lighting part, and when the setting of the control mode of the response sound with respect to the operation ordered by the control device 100-1 is the muting of the response sound, the control unit 208 orders the lighting part to carry out lighting. Then, the lighting part performs lighting based on the lighting order. For example, the lighting part may be a light-emitting member such as a light emitting diode (LED). Note that, the lighting part may perform flashing, changing lighting color or achieving high luminance of lighting.

In this way, according to the second modification example of the present embodiment, the imaging device 200-1 visually indicates the response with respect to the operation which is ordered from the control device 100-1 to the imaging device 200-1 when the control mode of the response sound is the muting. Accordingly, a user can grasp that the imaging device 200-1 is operating based on the operation order by the control device 100-1 even in the case where the response sound is muted, and it becomes possible to enhance a user's convenience furthermore.

3. SECOND EMBODIMENT OF THE PRESENT DISCLOSURE (EXAMPLE WHERE CONTROL DEVICE DETERMINES CONTROL MODE OF RESPONSE SOUND)

As mentioned above, the information processing system according to the first embodiment of the present disclosure has been described. Next, an information processing system according to a second embodiment of the present disclosure will be described. In the information processing system according to the present embodiment, the control device 100-2 determines the control mode of the response sound, and transmits the operation order information including information of the determined control mode of the response sound to the imaging device 200-2. Then, the imaging device 200-2 controls the response sound based on information of the control mode of the response sound included in the received operation order information.

[3-1. Configuration of Information Processing System]

Figure 7:
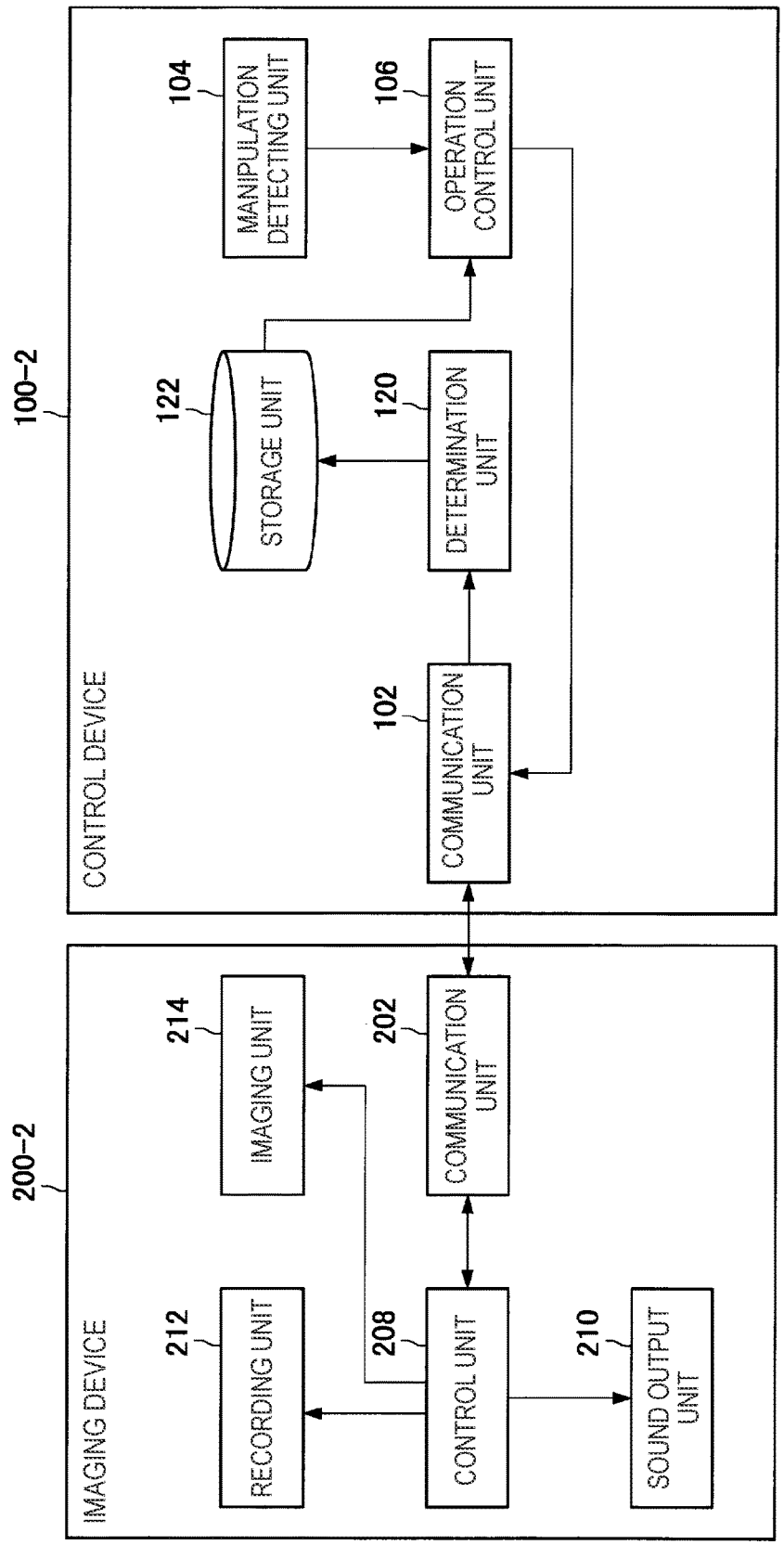
FIG. 7 is a block diagram illustrating a schematic function configuration of an information processing system according to a second embodiment of the present disclosure.

First, a configuration of the information processing system according to the second embodiment of the present disclosure will be described with reference to FIG. 7. FIG. 7 is a block diagram illustrating a schematic function configuration of the information processing system according to the second embodiment of the present disclosure.

The information processing system according to the present embodiment is configured by the control device 100-2 and the imaging device 200-2 as illustrated in FIG. 7.

The control device 100-2 includes a determination unit 120 and a storage unit 122 in addition to the communication unit 102, the manipulation detecting unit 104 and the operation control unit 106.

The determination unit 120 determines the control mode of the response sound in the imaging device 200-2 with respect to the operation ordered by the control device 100-2. Specifically, the determination unit 120 determines the control mode of the response sound in the imaging device 200-1 with respect to the operation ordered by the control device 100-2 depending on whether a plurality of imaging devices 200-2 are connected to the control device 100-2. Then, the determination unit 120 makes the determined control mode of the response sound stored in the storage unit 122 as setting information. More specifically, the determination unit 120 determines an output presence/absence and an output mode of the response sound in the imaging device 200-2 depending on whether information according to a communication mode transmitted to the imaging device 200-2 by the communication unit 102 is information indicating single connection or multiple connection. For example, the determination unit 120 determines the control mode of the response sound to be the muting in the imaging device 200-2 when the communication mode to or from the imaging device 200-2 is the multiple connection.

The storage unit 122 stores the setting information of the response sound determined by the determination unit 120.

Figure 8:
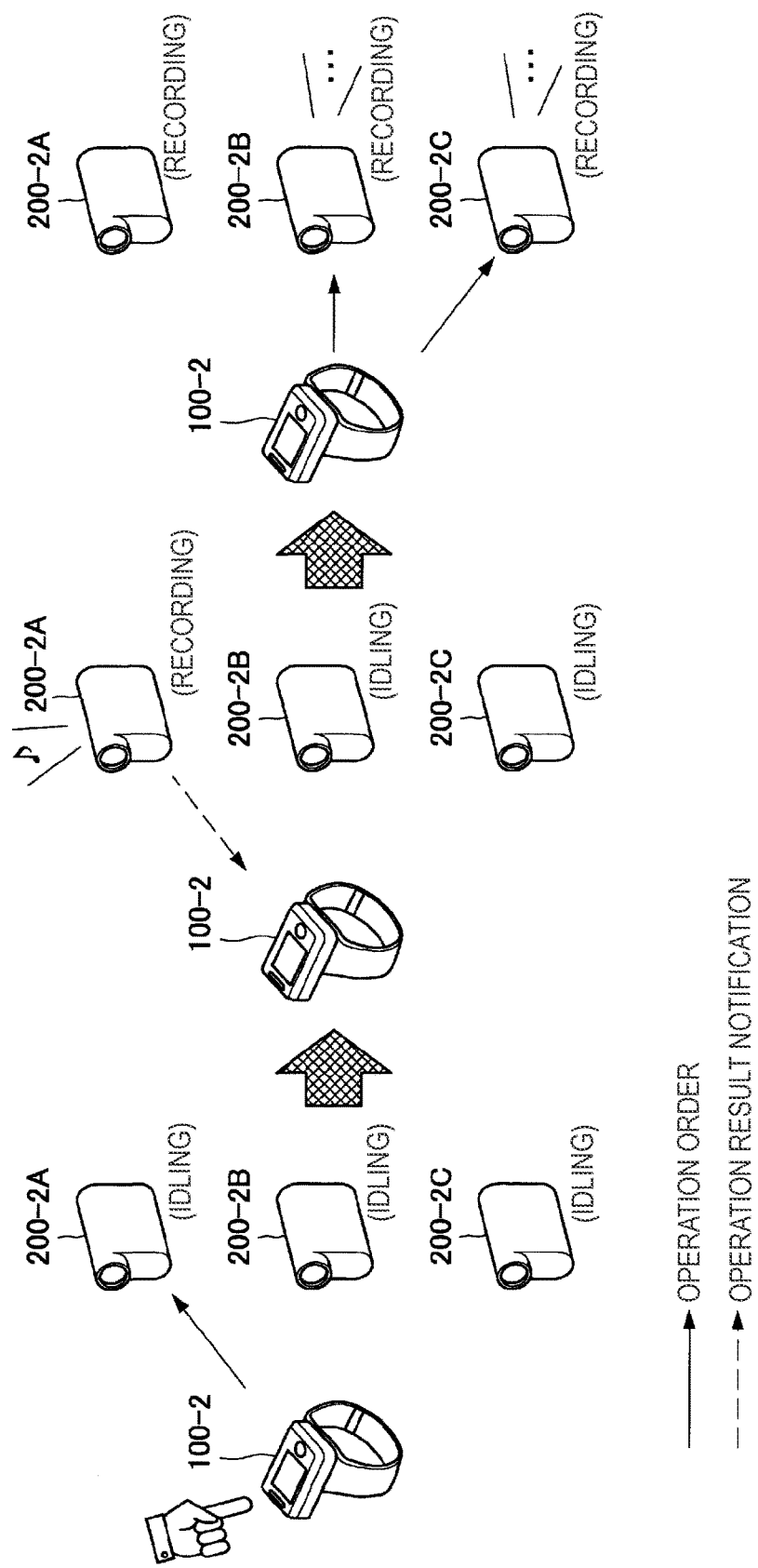
FIG. 8 is an explanatory view illustrating an example of an operation of the information processing system according to the present embodiment.

The operation control unit 106 orders generation of operation order information and transmission of the generated operation order information based on the setting information of the response sound set by the determination unit 120. Processing of the operation control unit 106 will be described specifically with reference to FIG. 8. FIG. 8 is an explanatory view illustrating an example of an operation of the information processing system according to the present embodiment.

First, when the operation order manipulation to the imaging device 200-2 is detected by the manipulation detecting unit 104, the operation control unit 106 generates the operation order information corresponding to the relevant operation order manipulation. For example, as illustrated in the left figure of FIG. 8, when the recording start order manipulation to the imaging devices 200-2A to 200-2C is performed by a user with respect to the control device 100-2, the operation control unit 106 generates the recording start order information corresponding to the relevant recording start order manipulation.

In addition, the operation control unit 106 acquires the setting information of the response sound stored in the storage unit 122, and determines whether the control mode of the response sound according to the acquired setting information is a predetermined mode. For example, the operation control unit 106 acquires the setting information of the response sound stored in the storage unit 122, and determines whether the acquired setting information of the response sound is the muting.

Then, when it is determined that the control mode of the response sound according to the setting information is a predetermined mode, the operation control unit 106 makes the communication unit 102 transmit the generated operation order information toward one imaging device 200-2 specified by the operation order manipulation by a user. For example, when it is determined that the control mode of the response sound according to the setting information is the muting, the operation control unit 106 makes the communication unit 102 transmit the generated recording start order information to the imaging device 200-2A as illustrated in the left figure of FIG. 8. Note that, one imaging device 200-2 to which the operation order information is transmitted may be determined in advance. For example, one imaging device 200-2 to which the operation order information is transmitted may be the imaging device 200-2 whose communication connection has been established first, or the imaging device 200-2, etc. where a response time of communication to or from the control device 100-2 is shorter than other imaging devices 200-2. In addition, when it is determined that the control mode of the response sound according to the setting information is not a predetermined mode, the operation control unit 106 makes the communication unit 102 transmit the generated operation order information toward each of the connected imaging devices 200-2.

Next, when the operation result notification information is received from the imaging device 200-2 to which the operation order information has been transmitted by the communication unit 102, the operation control unit 106 acquires the setting information of the response sound from the storage unit 122, and adds the acquired setting information to the generated operation order information. For example, as illustrated in the center figure of FIG. 8, when the operation result notification information is received from the imaging device 200-2A, the operation control unit 106 acquires from the storage unit 122 the setting information where the response sound is made to be the muting, and adds the acquired setting information to the generated recording start order information. Note that, when an operation result indicated by the operation result notification information is not normal termination, the operation control unit 106 may display as such on a display unit which the control device 100-2 includes separately. In addition, the operation control unit 106 may make the communication unit 102 transmit again the same operation order information toward the same imaging device 200-2.

Then, the operation control unit 106 makes the communication unit 102 transmit the operation order information with the setting information added toward the imaging devices 200-2 other than one imaging device 200-2 to which the operation order information has been transmitted already. For example, as illustrated in the right figure of FIG. 8, the operation control unit 106 makes the communication unit 102 transmit the recording start order information with the setting information added toward the imaging devices 200-2B and 200-2C.

In this way, the imaging device 200-2 which outputs the response sound is selected by a user. Accordingly, the response sound will be output from the imaging device 200-2 whose response sound a user wants to confirm, and it becomes possible to enhance a user's convenience. In addition, the setting information according to the control mode of the response sound is added to the operation order information. Accordingly, the number of times of communication is reduced, and it becomes possible to reduce a communication traffic and a processing load according to communication processing. Note that, the setting information of the response sound may be transmitted separately from the operation order information.

Here, when descriptions return to a configuration of the information processing system with reference to FIG. 7, the imaging device 200-2 includes the communication unit 202, the control unit 208, the sound output unit 210, the recording unit 212 and the imaging unit 214.

Based on the operation order information received by the communication unit 202 from the control device 100-2 and the setting information of the response sound added to the relevant operation order information, the control unit 208 controls the response sound and controls the operation of the imaging device 200-2. Specifically, when the operation order information is received by the communication unit 202, the control unit 208 controls the sound output unit 210 depending on whether the setting information of the response sound has been added to the received operation order information, and controls the recording unit 212 and the imaging unit 214 based on the operation order information.

For example, when the recording start order information is received by the communication unit 202, the control unit 208 orders the sound output unit 210 to output the recording start sound when the setting information of the response sound has not been added to the received recording start order information. Then, after the recording start sound has been output by the sound output unit 210, the control unit 208 orders the recording unit 212 and the imaging unit 214 to start recording. In addition, when the setting information of the response sound has been added to the received recording start order information, the control unit 208 orders the sound output unit 210 to control output of the recording start sound, and orders the recording unit 212 and the imaging unit 214 to start recording in accordance with the setting information of the response sound. Note that, the setting information of the response sound added to the recording start order information is stored in the storage unit, and may be used for control of the response sound with respect to an operation ordered thereafter. In addition, when recording end order information is received from the control device 100-2, the relevant setting information stored in the storage unit may be deleted from the storage unit.

In addition, the control unit 208 generates the operation result notification information with respect to the control device 100-2. Specifically, after execution of the operation ordered in the operation order information received by the communication unit 202, the control unit 208 generates the operation result notification information according to execution result of the relevant operation. Then, the control unit 208 makes the communication unit 202 transmit the generated operation result notification information toward the control device 100-2.

[3-2. Processing of Information Processing System]

Figure 9:
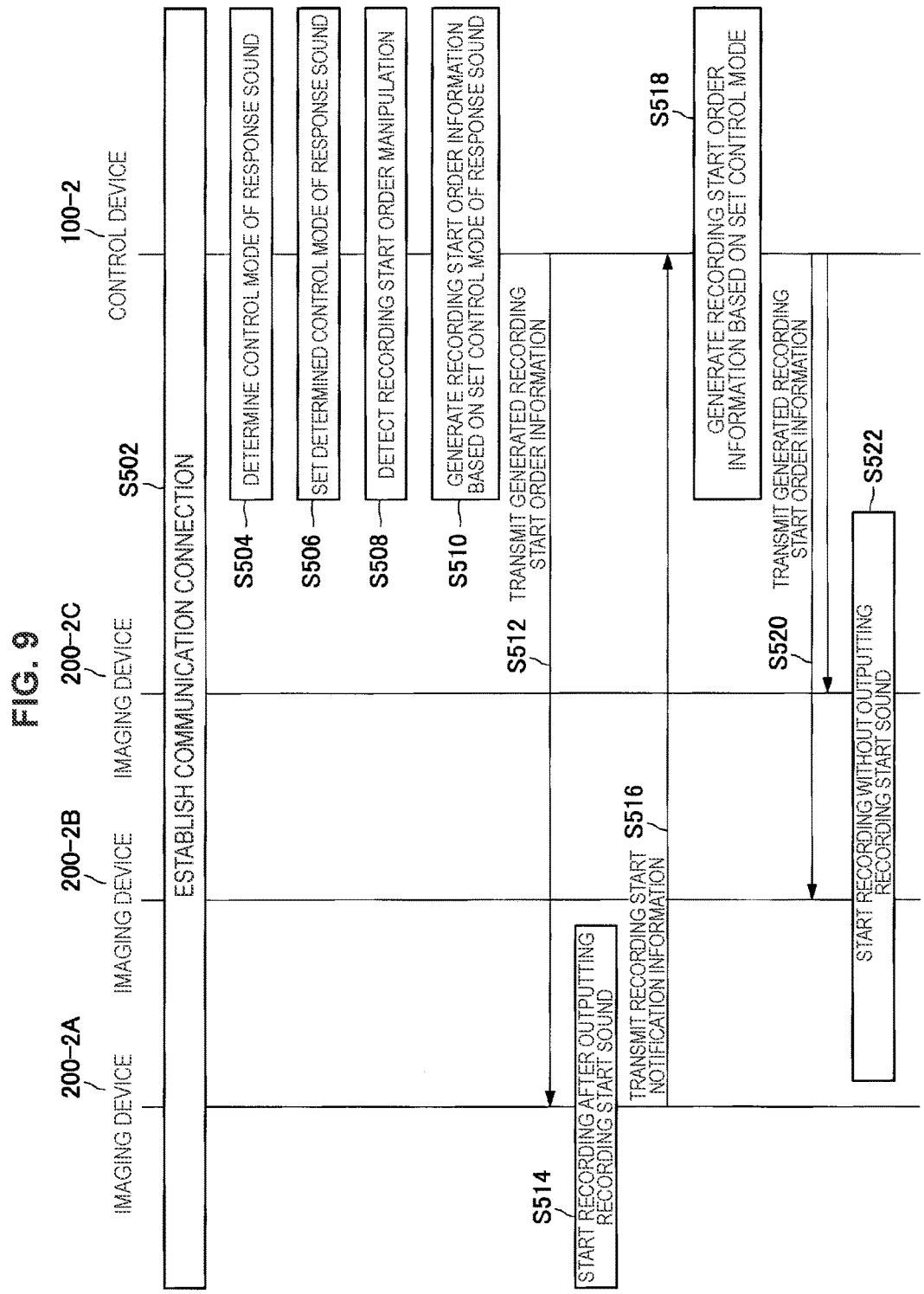
FIG. 9 is a sequence diagram illustrating conceptually processing of the information processing system in the present embodiment.

Next, processing of the information processing system in the present embodiment will be described with reference to FIG. 9. FIG. 9 is a sequence diagram illustrating conceptually processing of the information processing system in the present embodiment.

First, each of the imaging devices 200-2A to 200-2C and the control device 100-2 establish communication connection (Step S502). Specifically, since the processing is the same substantially as the processing of Step S302 of FIG. 4 of the first embodiment, the description will be omitted.

Next, the control device 100-2 determines the control mode of the response sound (Step S504). Specifically, based on the information of communication mode in the communication with the imaging devices 200-2A to 200-2C, the determination unit 120 determines the control mode of the response sound in the imaging device 200-2.

Next, the control device 100-2 sets the determined control mode (Step S506). Specifically, the determination unit 120 makes the determined control mode stored as the setting information in the storage unit 122.

Next, the control device 100-2 detects the recording start manipulation (Step S508). Specifically, since the processing is the same substantially as the processing of Step S308 of FIG. 4 of the first embodiment, the description will be omitted.

Next, the control device 100-2 generates the recording start order based on the set control mode of the response sound (Step S510). Specifically, when the recording start order manipulation to the imaging device 200-2 is detected by the manipulation detecting unit 104, the operation control unit 106 generates the recording start order information. Then, when it is determined that the control mode of the response sound according to the setting information stored in the storage unit 122 is a predetermined mode, e.g. the muting, the operation control unit 106 specifies transmission destination of the generated recording start order information as one imaging device 200-2 specified by the detected recording start order manipulation.

Next, the control device 100-2 transmits the generated recording start order information to the imaging device 200-2A (Step S512). Specifically, the communication unit 102 transmits the recording start order information generated by the operation control unit 106 to the imaging device 200-2A specified by the operation control unit 106.

Next, the imaging device 200-2A outputs the recording start sound to start recording (Step S514). Specifically, when the recording start order information is received by the communication unit 202, the control unit 208 determines that the setting information of the response sound has not been added to the received recording start order information, and orders the sound output unit 210 to output the recording start sound. Then, the control unit 208 orders the recording unit 212 and the imaging unit 214 to start recording after the recording start sound has been output by the sound output unit 210.

Next, the imaging device 200-2A transmits the recording start notification information to the control device 100-2 (Step S516). Specifically, the control unit 208 generates the recording start notification information according to the execution result of the recording start after execution of the recording start order, and the communication unit 202 transmits the generated recording start notification information toward the control device 100-2.

Next, the control device 100-2 generates the recording start order information based on the set control mode (Step S518). Specifically, when the recording start notification information is received by the communication unit 102 from the imaging device 200-2A, the operation control unit 106 adds the setting information of the response sound stored in the storage unit 122 to the generated recording start order information.

Next, the control device 100-2 transmits the generated recording start order information to the imaging devices 200-2B and 200-2C (Step S520). Specifically, the communication unit 102 transmits to the imaging devices 200-2B and 200-2C the recording start order information to which the setting information of the response sound has been added.

Next, each of the imaging devices 200-2B and 200-2C starts recording without outputting the recording start sound (Step S522). Specifically, when the recording start order information is received by the communication unit 202, the control unit 208 orders the sound output unit 210 to output the recording start sound since the setting information of the response sound has been added to the received recording start order information. Then, the control unit 208 orders the recording unit 212 and the imaging unit 214 to start recording after the recording start sound has been output by the sound output unit 210.

In this way, according to the second embodiment of the present disclosure, the control device 100-2 determines the control mode of the response sound depending on whether a plurality of imaging devices 200-2 are connected to the control device 100-2. Then, the imaging device 200-2 controls the response sound in accordance with the determined control mode with respect to the operation ordered by the control device 100-2. Accordingly, as the control device 100-2 performs determination processing collectively with respect to the control mode of the response sound in the imaging device 200-2, the determination processing in the imaging device 200-2 becomes unnecessary, and savings of calculation resources and reduction of processing loads in the imaging device 200-2 become possible.

Furthermore, the control device 100-2 determines the control mode of the recording start sound, and notifies the imaging device 200-2 of the determined control mode. Then, before one imaging device 200-2 of a plurality of imaging devices 200-2 performs the ordered recording start operation and after the recording start sound is output by the relevant one imaging device 200-2, each of other imaging devices 200-2 controls the recording start sound in accordance with the notification of the control mode and performs the ordered recording start operation. Accordingly, the recording start sound will be output so as not to be recorded, and a user can aurally grasp the recording start, and it becomes possible to enhance a user's convenience.

[3-3. Modification Example]

As mentioned above, the second embodiment of the present disclosure has been described. Note that, the present embodiment is not limited to examples mentioned above. A modification example of the present embodiment will be described in the following.

Figure 10:
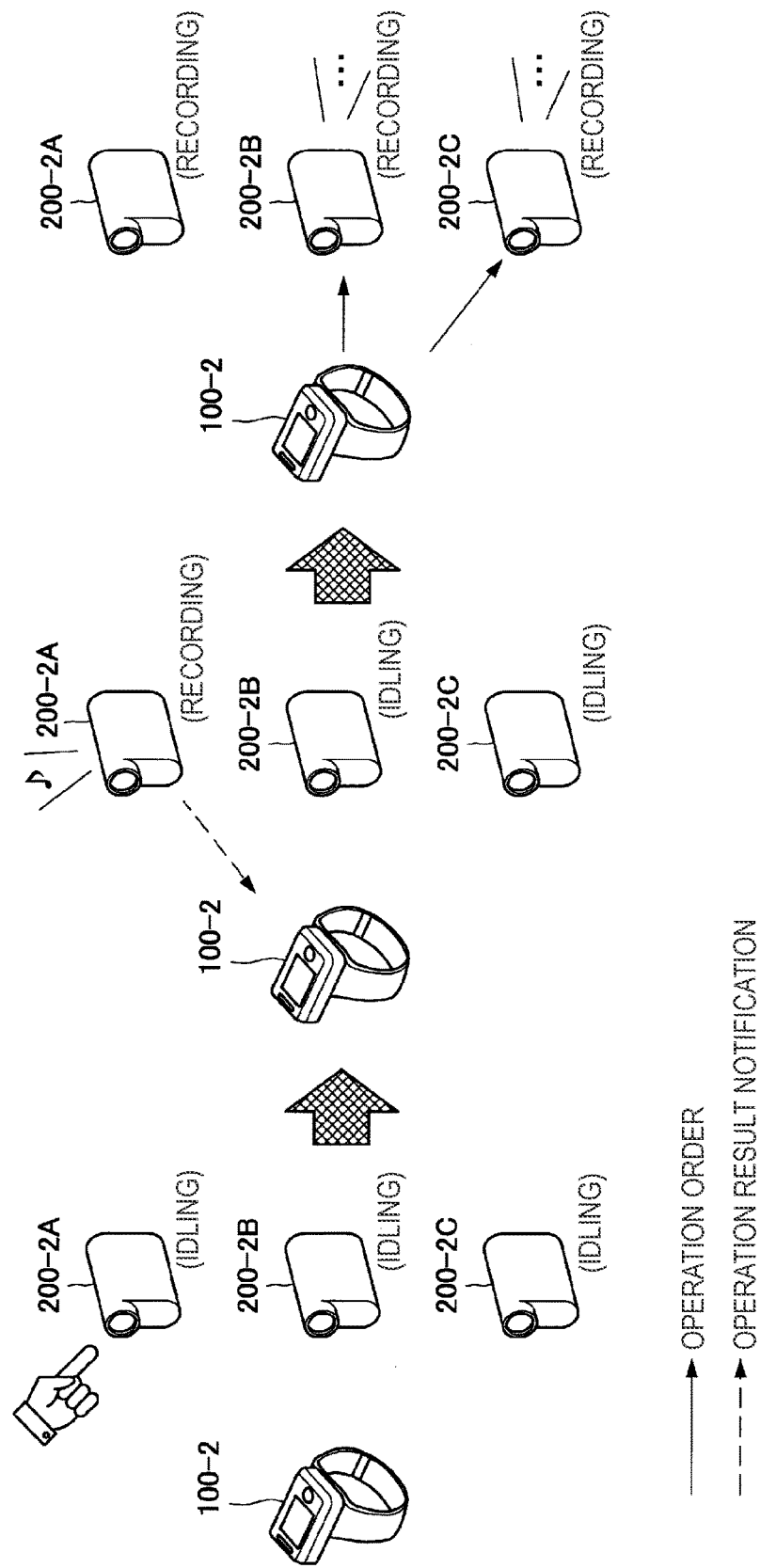
FIG. 10 is an explanatory view illustrating another example of an operation of an information processing system according to a modification example of the present embodiment.

As a modification example of the present embodiment, each of other imaging devices 200-2 may start operation with the operation order of one imaging device 200-2 of a plurality of imaging devices 200-2 made as a trigger. Specifically, one imaging device 200-2 of the plurality of imaging devices 200-2 starts operation after having output the response sound by a user's manipulation, and the relevant one imaging device 200-2 which has started operation transmits the operation order information to the control device 100-2. Next, when the operation order information is received, the control device 100-2 determines the control mode of the response sound, and adds the setting information according to the determined control mode of the response sound to the operation order information, and transmits the relevant operation order information to other imaging devices 200-2. Then, the other imaging devices 200-2 control the response sound in accordance with the setting information of the response sound added to the received operation order information, and start operation. Furthermore, an operation of the control device 100-2 and imaging device 200-2 in the present modification example will be described in detail with reference to FIG. 10. FIG. 10 is an explanatory view illustrating other examples of operation of the information processing system according to the modification example of the present embodiment.

First, when the operation order manipulation to the imaging device 200-2 is detected by the manipulation detecting unit which the imaging device 200-2 includes separately, the control unit 208 orders the sound output unit 210 to output the response sound. For example, as illustrated in the left figure of FIG. 10, when the recording start order manipulation is performed by a user with respect to the imaging device 200-2A, the recording start order manipulation is detected by the manipulation detecting unit of the imaging device 200-2, and the control unit 208 orders the sound output unit 210 to output the recording start sound.

Next, after the response sound is output by the sound output unit 210, the control unit 208 orders the recording unit 212 and the imaging unit 214 to operate. Furthermore, the control unit 208 generates the operation order information, and makes the communication unit 202 transmit the generated operation order information toward the control device 100-2. For example, as illustrated in the center figure of FIG. 10, after the recording start sound has been output by the sound output unit 210 of the imaging device 200-2A, the control unit 208 orders the recording unit 212 and the imaging unit 214 to start recording, and makes a state of the imaging device 200-2A transitioned to "recording" from "idling". Furthermore, the control unit 208 generates the recording start order information with respect to other imaging devices 200-2B and 200-2C, and makes the communication unit 202 transmit the generated recording start order information toward the control device 100-2.

Then, when the operation order information is received by the communication unit 102, the determination unit 120 determines the control mode of the response sound, and the operation control unit 106 adds the setting information according to the determined control mode of the response sound to the received operation order information. For example, when the recording start order information is received by the communication unit 102, the determination unit 120 determines the control mode of the response sound. Then, the operation control unit 106 adds the determination result by the determination unit 120, e.g. the setting information with the response sound as the muting to the received recording start order information.

Next, the operation control unit 106 makes the communication unit 102 transmit the operation order information to which the setting information according to the control mode of a response sound has been added to each of the imaging devices 200-2 other than the transmission source of the operation order information. For example, as illustrated in the right figure of FIG. 10, the operation control unit 106 makes the communication unit 102 transmit the recording start order information to which the setting information with the response sound as the muting has been added toward the imaging devices 200-2B and 200-2C other than the imaging device 200-2A which has generated and transmitted the recording start order information.

Figure 11:
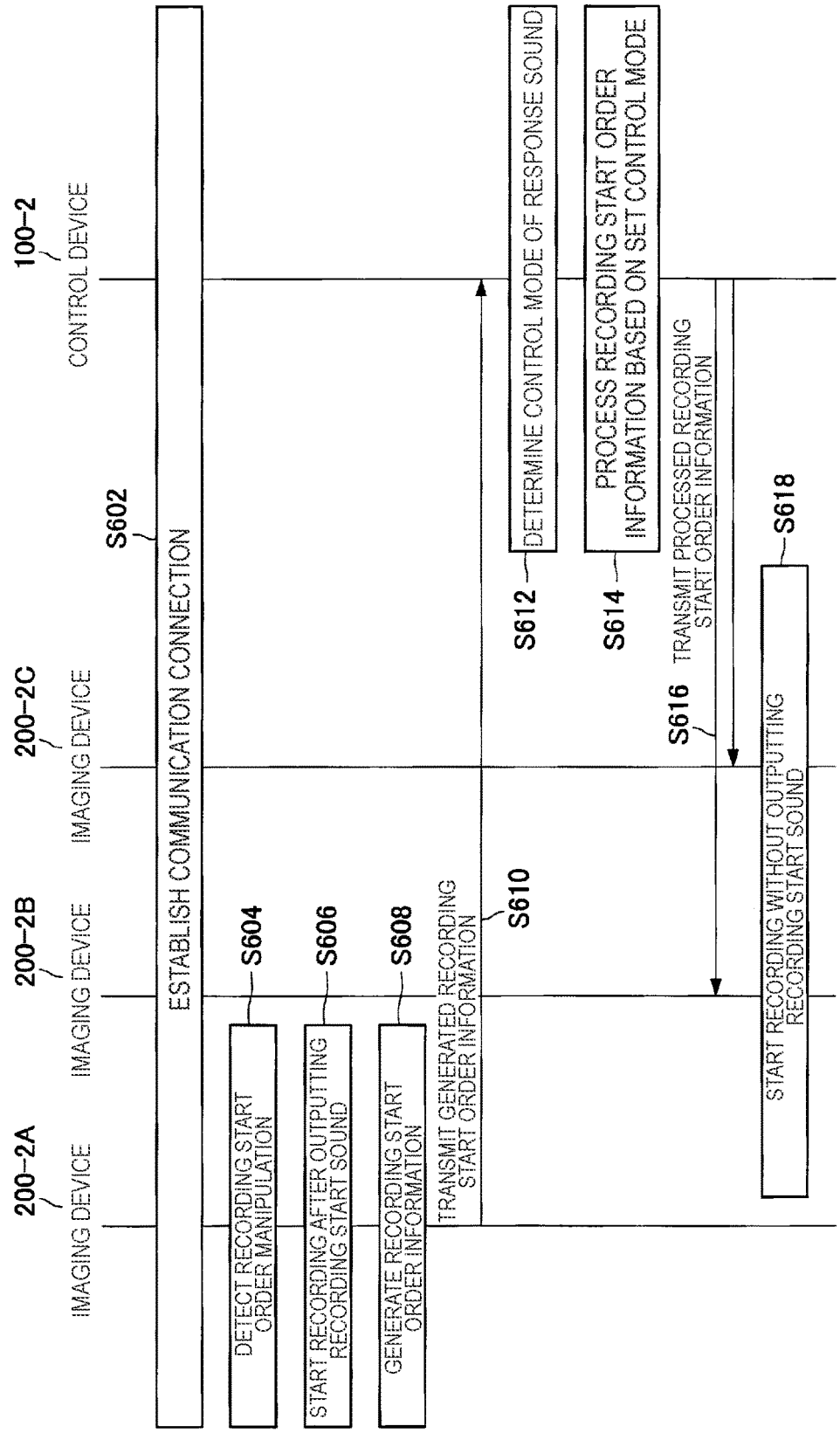
FIG. 11 is a sequence diagram illustrating conceptually processing of the information processing system in the modification example of the present embodiment.

Subsequently, processing of the information processing system in the present modification example will be described with reference to FIG. 11. FIG. 11 is a sequence diagram illustrating conceptually processing of the information processing system in the present modification example.

First, each of the imaging devices 200-2A to 200-2C and the control device 100-2 establish communication connection (Step S602). Specifically, since the processing is the same substantially as the processing of Step S302 of FIG. 4 of the first embodiment, the description will be omitted.

Next, the imaging device 200-2A detects the recording start order manipulation (Step S604). Specifically, the manipulation detecting unit which the imaging device 200-2A includes detects the recording start order manipulation by a user.

Next, the imaging device 200-2A outputs the recording start sound to start recording (Step S606). Specifically, when the recording start order manipulation is detected by the manipulation detecting unit, the control unit 208 orders the sound output unit 210 to output the recording start sound, and after the recording start sound has been output by the sound output unit 210, orders the recording unit 212 and the imaging unit 214 to start recording.

Next, the imaging device 200-2A generates the recording start order information (Step S608). Specifically, after the recording start of the recording unit 212 and the imaging unit 214, the control unit 208 generates the recording start order information with respect to other imaging devices 200-2B and 200-2C.

Next, the imaging device 200-2A transmits the generated recording start order information to the control device 100-2 (Step S610). Specifically, the communication unit 202 makes the generated recording start order information transmitted to the control device 100-2.

Next, the control device 100-2 determines the control mode of the response sound (Step S612). Specifically, when the recording start order information is received by the communication unit 102, the determination unit 120 determines the control mode of the response sound in the imaging device 200-2 based on the information of communication mode in the communication with the imaging devices 200-2A to 200-2C.

Next, the control device 100-2 processes the recording start order information based on the set control mode (Step S614). Specifically, the operation control unit 106 adds the control mode of the response sound determined by the determination unit 120, e.g. the setting information according to the muting, to the received recording start order information.

Next, the control device 100-2 transmits the processed recording start information to the imaging devices 200-2B and 200-2C (Step S616). Specifically, the communication unit 102 transmits the recording start order information to which the setting information according to the control mode of the response sound has been added by the operation control unit 106 to the imaging devices 200-2B and 200-2C.

Next, each of the imaging devices 200-2B and 200-2C starts recording without outputting the recording start sound (Step S618). Specifically, since the processing is the same substantially as the processing of Step S522 of FIG. 9 of the present embodiment, the description will be omitted.

In this way, according to the modification example of the present embodiment, each of other imaging devices 200-2 starts operation with the operation order of one imaging device 200-2 of a plurality of imaging devices 200-2 made as a trigger, and only the relevant one imaging device 200-2 outputs the response sound. Accordingly, after the response sound has been output and recording has been started in the imaging device 200-2 manipulated by a user, operations of other imaging devices 200-2 will be started via the control device 100-2, and thereby, the number of times of communication between the imaging device 200-2 and the control device 100-2 is reduced as compared with the second embodiment, and it becomes possible to shorten a time to the operation start of each of the imaging devices 200-2.

4. HARDWARE CONFIGURATION OF THE CONTROL DEVICE ACCORDING TO AN EMBODIMENT OF THE PRESENT DISCLOSURE

The embodiments of the present disclosure have been described above. The processes of the control device 100 described above are realized through cooperation of software and the hardware of the control device 100 to be described below.

Figure 12:
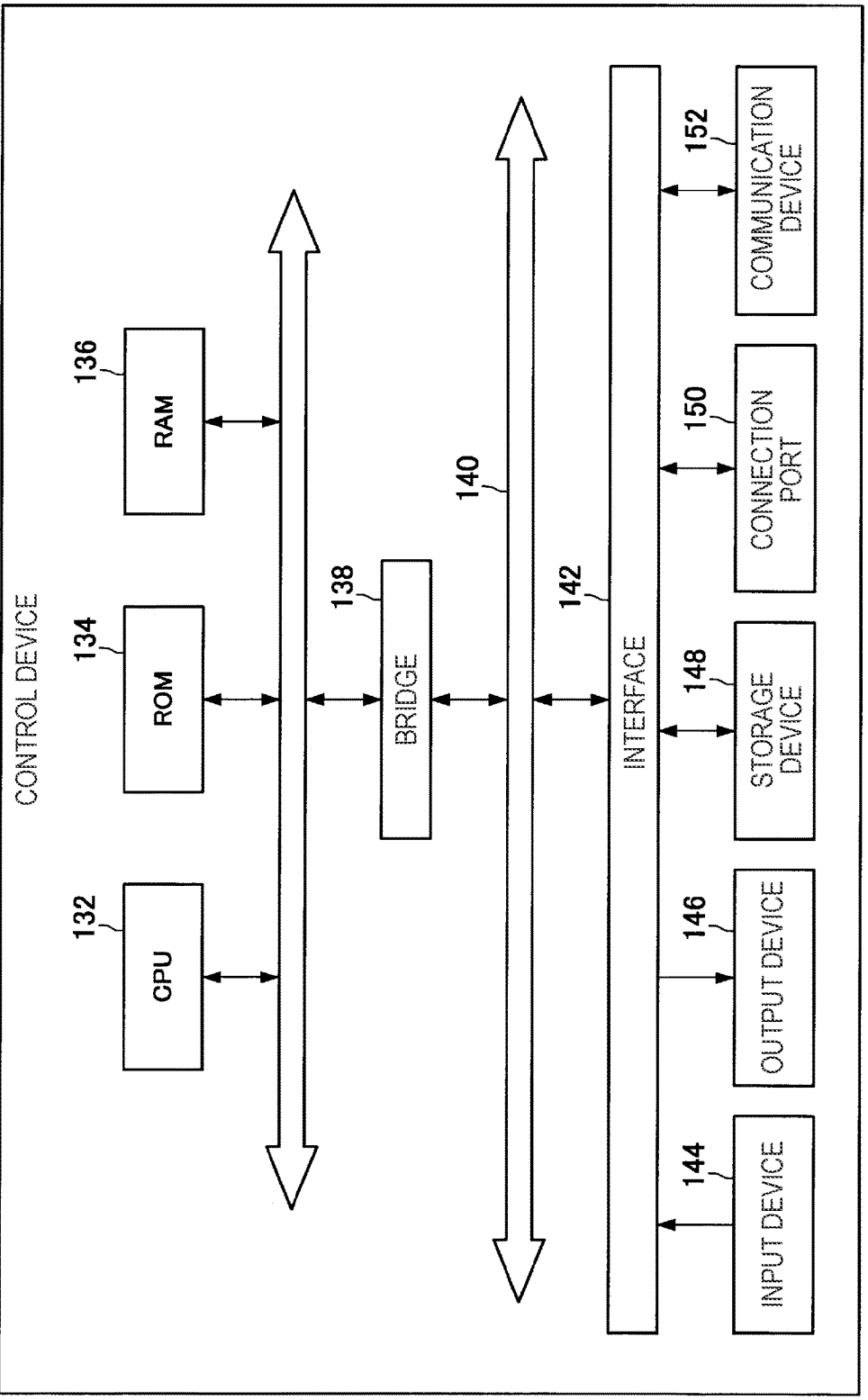
FIG. 12 is an explanatory view illustrating a hardware configuration of a control device according to the present disclosure.

FIG. 12 is an explanatory diagram illustrating a hardware configuration of the control device 100 according to an embodiment of the present disclosure. As illustrated in FIG. 12, the control device 100 includes a central processing unit (CPU) 132, a read-only memory (ROM) 134, a random access memory (RAM) 136, a bridge 138, a bus 140, an interface 142, an input device 144, an output device 146, a storage device 148, a connection port 150, and a communication device 152.

The CPU 132 functions as an arithmetic processing unit and a control unit and realizes an operation of a manipulation detecting unit 104, an operation control unit 106 and a determination unit 120 in the control device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit 122 in the control device 100 is realized by the ROM 134 and the RAM 136. The CPU 132, the ROM 134, and the RAM 136 are mutually connected by an internal bus configured by a CPU bus or the like.

The input device 144 is configured to include an input unit, such as a mouse, a keyboard, a touch panel, a button, a microphone, a switch, and a lever, used for the user to input information, and an input control circuit which generates an input signal based on an input by the user and outputs the input signal to the CPU 132. The user of the control device 100 can input various kinds of data or can give an instruction of a processing operation to the control device 100 by manipulating the input device 144.

The output device 146 outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The connection port 150 is, for example, a bus connected to an external information processing process or a peripheral device of the control device 100. The connection port 150 may be a Universal Serial Bus (USB).

The communication device 152 is, as an example of the communication unit 102 of the control device 100, a communication interface configured by a communication device connected to a network. The communication device 152 may be a device corresponding to infrared communication, may be a communication device corresponding to a wireless local area network (LAN), may be a communication device corresponding to Long Term Evolution (LTE), or may be a wired communication device performing communication in a wired manner.

5. CONCLUSION

As mentioned above, according to the first embodiment of the present disclosure, setting manipulation of the response sound by a user becomes unnecessary by the control mode of the response sound being determined automatically, and it becomes possible to enhance a user's convenience. In addition, as determination of the control mode of the response sound is performed by the imaging device 200-1, it is not necessary to provide determination processing of the control mode of the response sound in the control device 100-1, and practical use of calculation resources to other applications and reduction of a processing load of the control device 100-1 become possible. In addition, according to the second embodiment of the present disclosure, as the control device 100-2 performs determination processing collectively with respect to the control mode of the response sound in the imaging device 200-2, the determination processing in the imaging device 200-2 becomes unnecessary, and savings of calculation resources and reduction of processing loads in the imaging device 200-2 become possible.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an example where the response sound is the recording start sound has been described in the above-mentioned embodiment, whilst the present technology is not limited to the above examples. For example, the response sound may be a recording end sound. Note that, when the response sound is the recording end sound, in the second embodiment, after the imaging devices 200-2 other than the imaging device 200-2 which outputs the recording end sound have ended recording, the imaging device 200-2 which outputs the recording end sound outputs the recording end sound after having ended recording.

For example, the control device 100-2 transmits the recording end order information to which the setting information with the response sound as the muted sound has been added to the imaging devices 200-2 other than one imaging device 200-2 which is made to output the recording end sound. Then, each of the imaging devices 200-2 which have received the relevant recording end order information ends recording without outputting the recording end sound in accordance with the setting information added to the recording end order information. Furthermore, each of the imaging devices 200-2 which have ended recording transmits recording end notification information to the control device 100-2. The control device 100-2 having received each of the recording end notification information transmits to the relevant one imaging device 200-2 the recording end order information to which the setting information of the response sound has not been added. Then, when the recording end order information is received, the relevant one imaging device 200-2 makes the recording end sound output after having ended recording. In this case, a user can aurally grasp that recording has been ended without the recording end sound being recorded, and it becomes possible to enhance a user's convenience.

In addition, the imaging device 200 may output the recording start sound of a predetermined frequency, and filter the sound of a predetermined frequency in a period until a predetermined time elapses after the recording start. For example, the control device 100 transmits the recording start order information to each of the imaging devices 200, and when the recording start order information is received, each of the imaging devices 200 performs setting of filtering the predetermined frequency with respect to the sound acquired by sound-collecting. Then, each of the imaging devices 200 outputs the recording start sound to start recording and imaging after the relevant filtering. Note that, the filtering of the predetermined frequency may be performed using a band pass filter (BPF), etc. In this case, since processing is carried out so that the response sound may not be recorded when the sound acquired by the sound-collecting is recorded, it becomes possible to prevent the response sound from being recorded without controlling the sound output. Note that, the filtering of the predetermined frequency may be performed on the recorded data after the recording ends.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing method including:

establishing a connection, by a recording device, to a control device via communication; and determining a control mode of a response sound in the recording device with respect to an operation ordered by the control device depending on whether a plurality of recording devices are connected to the control device.

(2)

The information processing method according to (1), further including:

determining, by the control device, a control mode of the response sound depending on whether a plurality of recording devices are connected to the control device; and controlling, by the recording device, the response sound in accordance with the determined control mode with respect to an operation ordered by the control device.

(3)

The information processing method according to (2), wherein an operation ordered by the control device includes a recording start operation, the response sound includes a recording start sound with respect to the recording start operation, and the information processing method further includes:

determining, by the control device, when a plurality of recording devices are connected to the control device, a control mode of the recording start sound, and notifying the recording devices of the determined control mode; and after outputting of the recording start sound before one recording device of the plurality of recording devices performs the ordered recording start operation, controlling, by each of recording devices other than the one recording device, the recording start sound in accordance with a notification of the control mode, and performing the ordered recording start operation.

(4)

The information processing method according to (3), wherein the one recording device is selected by a user.

(5)

The information processing method according to (3), further including:

starting, by one recording device of the plurality of recording devices, recording by a user's manipulation;

notifying, by the one recording device, the control device of recording start;

determining, by the control device, a control mode of the recording start sound after the notification of recording start by the one recording device when a plurality of recording devices are connected to the control device, and notifying, by the control device, the recording devices other than the one recording device of the determined control mode; and controlling, by each of the recording devices other than the one recording device, the recording start sound in accordance with the notification of the control mode, and performing recording start operation, after outputting of the recording start sound before the one recording device performs the recording start operation.

(6)

The information processing method according to any one of (2) to (5), wherein a notification of a control mode of the response sound is included in the order of the operation.

(7)

The information processing method according to any one of (1) to (6), wherein the control mode of the response sound includes muting.

(8)

The information processing method according to (7), further including:

visually indicating, by the recording device, a response with respect to the operation when the control mode of the response sound is the muting.

(9)

The information processing method according to (1), further including:

determining, by each of the plurality of recording devices, a control mode of the response sound depending on whether a plurality of recording devices are connected to the control device; and controlling, by the recording device, the response sound in accordance with the determined control mode, with respect to an operation ordered by the control device.

(10)

The information processing method according to (9), further including:

acquiring, when a plurality of recording devices are connected to the control device, by each of the plurality of recording devices, information changing depending on a distance to or from other recording devices; and determining, by each of the plurality of recording devices, a control mode of the response sound based on the acquired information, and controlling the response sound in accordance with the determined control mode.

(11)

A control device including:

a communication unit configured to establish a connection to a recording device via communication; and a determination unit configured to determine a control mode of a response sound in the recording device with respect to an operation ordered by the control device depending on whether a plurality of recording devices are connected to the control device.

(12)

The control device according to (11), further including:

an operation ordering unit configured to order, via the communication unit, an operation which becomes a trigger to make the recording device control the response sound in accordance with the control mode determined by the determination unit.

(13)

The control device according to (12), wherein the operation ordered by the operation ordering unit includes a recording start operation;

the response sound includes a recording start sound with respect to the recording start operation;

the determination unit determines a control mode of the recording start sound when a plurality of recording devices are connected to the control device;

the communication unit notifies a recording device of the determined control mode; and after outputting of the recording start sound before one recording device of the plurality of recording devices performs recording start operation ordered by the operation ordering unit, each of the recording devices other than the one recording device is operated to control the recording start sound in accordance with the notification of the control mode and to perform the ordered recording start operation.

(14)

The control device according to (13), further including:

a manipulation detecting unit configured to detect a selection operation of the one recording device by a user.

(15)

The control device according to (13), wherein when a plurality of recording devices are connected to the control device, the determination unit determines a control mode of the recording start sound upon receiving, by the communication unit, a notification of recording start from one recording device of the plurality of recording devices, which has started recording by a user's manipulation;

the communication unit notifies the recording devices other than the one recording device of the determined control mode; and after outputting of the recording start sound before the one recording device performs a recording start operation, each of the recording devices other than the one recording device is operated to control the recording start sound in accordance with the notification of the control mode and to perform the recording start operation.

(16)

The control device according to any one of (12) to (15), wherein a notification of a control mode of the response sound is included in the order of the operation.

(17)

The control device according to any one of (11) to (16), wherein a control mode of the response sound includes muting.

(18)

A recording device including:

a communication unit that is connected to a control device via communication; and a determination unit configured to determine a control mode of a response sound in the recording device with respect to an operation ordered by the control device depending on whether a plurality of recording devices are connected to the control device.

(19)

The recording device according to (18), further including:

a control unit configured to control the response sound in accordance with the determined control mode with respect to an operation ordered by the control device.

(20)

The recording device according to (19), further including:

when a plurality of recording devices are connected to the control device, an information acquiring unit configured to acquire information changing depending on a distance to or from other recording devices, wherein the determination unit determines a control mode of the response sound based on the information acquired by the information acquiring unit, and the control unit controls the response sound in accordance with the determined control mode.

(21)

The recording device according to (19) or (20), wherein when a control mode of the response sound is determined to be muting by the determination unit, the control unit makes the recording device operate so as to visually indicate a response with respect to the operation.

(22)

An information processing system including:

a communication unit configured to establish a connection to a control device via communication; and a determination unit configured to determine a control mode of a response sound in a recording device with respect to an operation ordered by the control device depending on whether a plurality of recording devices are connected to the control device.

(23)

A program for making a computer realize:

a communication function configured to establish a connection to a control device via communication; and a determination function configured to determine a control mode of a response sound in a recording device with respect to an operation ordered by the control device depending on whether a plurality of recording devices are connected to the control device.

REFERENCE SIGNS LIST 100 control device
102 communication unit
104 manipulation detecting unit
106 operation control unit
120 determination unit
122 storage unit
200 imaging device
202 communication unit
204 determination unit
206 storage unit
208 control unit
210 sound output unit
212 recording unit
214 imaging unit

The invention claimed is:

1. An information processing method comprising:
    establishing a connection, by a recording device, to a control device via communication; and
    determining a control mode of a response sound in the recording device with respect to an operation ordered by the control device depending on whether a plurality of recording devices are connected to the control device.

2. The information processing method according to claim 1, further comprising:
    determining, by the control device, a control mode of the response sound depending on whether a plurality of recording devices are connected to the control device; and
    controlling, by the recording device, the response sound in accordance with the determined control mode with respect to an operation ordered by the control device.

3. The information processing method according to claim 2, wherein
    an operation ordered by the control device includes a recording start operation,
    the response sound includes a recording start sound with respect to the recording start operation, and
    the information processing method further comprises:
        determining, by the control device, when a plurality of recording devices are connected to the control device, a control mode of the recording start sound, and notifying the recording devices of the determined control mode; and
        after outputting of the recording start sound before one recording device of the plurality of recording devices performs the ordered recording start operation, controlling, by each of recording devices other than the one recording device, the recording start sound in accordance with a notification of the control mode, and performing the ordered recording start operation.

4. The information processing method according to claim 3, wherein
    the one recording device is selected by a user.

5. The information processing method according to claim 2, wherein:
    an operation ordered by the control device includes a recording start operation,
    the response sound includes a recording start sound with respect to the recording start operation, and
    the information processing method further comprises:
    starting, by one recording device of the plurality of recording devices, recording by a user's manipulation;
    notifying, by the one recording device, the control device of recording start;
    determining, by the control device, a control mode of the recording start sound after the notification of recording start by the one recording device when a plurality of recording devices are connected to the control device, and notifying, by the control device, the recording devices other than the one recording device of the determined control mode; and
    controlling, by each of the recording devices other than the one recording device, the recording start sound in accordance with the notification of the control mode, and performing the recording start operation, after outputting of the recording start sound before the one recording device performs the recording start operation.

6. The information processing method according to claim 2, wherein
    a notification of a control mode of the response sound is included in the order of the operation.

7. The information processing method according to claim 1, wherein
    the control mode of the response sound includes muting.

8. The information processing method according to claim 7, further comprising:
    visually indicating, by the recording device, a response with respect to the operation when the control mode of the response sound is the muting.

9. The information processing method according to claim 1, further comprising:
    determining, by each of the plurality of recording devices, a control mode of the response sound depending on whether a plurality of recording devices are connected to the control device; and
    controlling, by the recording device, the response sound in accordance with the determined control mode, with respect to an operation ordered by the control device.

10. The information processing method according to claim 9, further comprising:
    acquiring, when a plurality of recording devices are connected to the control device, by each of the plurality of recording devices, information changing depending on a distance to or from other recording devices; and
    determining, by each of the plurality of recording devices, a control mode of the response sound based on the acquired information, and controlling the response sound in accordance with the determined control mode.

11. A control device comprising:
    a communication unit configured to establish a connection to a recording device via communication; and
    a determination unit configured to determine a control mode of a response sound in the recording device with respect to an operation ordered by the control device depending on whether a plurality of recording devices are connected to the control device.

12. The control device according to claim 11, further comprising:
    an operation ordering unit configured to order, via the communication unit, an operation which becomes a trigger to make the recording device control the response sound in accordance with the control mode determined by the determination unit.

13. The control device according to claim 12, wherein
    the operation ordered by the operation ordering unit includes a recording start operation;
    the response sound includes a recording start sound with respect to the recording start operation;
    the determination unit determines a control mode of the recording start sound when a plurality of recording devices are connected to the control device;
    the communication unit notifies a recording device of the determined control mode; and
    after outputting of the recording start sound before one recording device of the plurality of recording devices performs recording start operation ordered by the operation ordering unit, each of the recording devices other than the one recording device is operated to control the recording start sound in accordance with the notification of the control mode and to perform the ordered recording start operation.

14. The control device according to claim 13, further comprising:
    a manipulation detecting unit configured to detect a selection operation of the one recording device by a user.

15. The control device according to claim 12, wherein
the operation ordered by the operation ordering unit includes a recording start operation;

the response sound includes a recording start sound with respect to the recording start operation;

when a plurality of recording devices are connected to the control device, the determination unit determines a control mode of the recording start sound upon receiving, by the communication unit, a notification of recording start from one recording device of the plurality of recording devices, which has started recording by a user's manipulation;

the communication unit notifies the recording devices other than the one recording device of the determined control mode; and after outputting of the recording start sound before the one recording device performs a recording start operation, each of the recording devices other than the one recording device is operated to control the recording start sound in accordance with the notification of the control mode and to perform the recording start operation.

16. The control device according to claim 12, wherein a notification of a control mode of the response sound is included in the order of the operation.

17. The control device according to claim 11, wherein a control mode of the response sound includes muting.

18. A recording device comprising:
a communication unit that is connected to a control device via communication; and
a determination unit configured to determine a control mode of a response sound in the recording device with respect to an operation ordered by the control device depending on whether a plurality of recording devices are connected to the control device.

19. The recording device according to claim 18, further comprising:
a control unit configured to control the response sound in accordance with the determined control mode with respect to an operation ordered by the control device.

20. The recording device according to claim 19, further comprising:
when a plurality of recording devices are connected to the control device, an information acquiring unit configured to acquire information changing depending on a distance to or from other recording devices, wherein
the determination unit determines a control mode of the response sound based on the information acquired by the information acquiring unit, and
the control unit controls the response sound in accordance with the determined control mode.

21. The recording device according to claim 19, wherein when a control mode of the response sound is determined to be muting by the determination unit, the control unit makes the recording device operate so as to visually indicate a response with respect to the operation.

22. An information processing system comprising:
a communication unit configured to establish a connection to a control device via communication; and
a determination unit configured to determine a control mode of a response sound in a recording device with respect to an operation ordered by the control device depending on whether a plurality of recording devices are connected to the control device.

23. A non-transitory computer readable medium storing program code, the program code being executable by a computer to perform operations comprising:
a communication function configured to establish a connection to a control device via communication; and
a determination function configured to determine a control mode of a response sound in a recording device with respect to an operation ordered by the control device depending on whether a plurality of recording devices are connected to the control device.

* * * * *